US011982120B2

United States Patent
(12) United States Patent
Lindley et al.

(10) Patent No.: US 11,982,120 B2
(45) Date of Patent: May 14, 2024

(54) OVERHEAD DOOR LIFT ASSEMBLY AND TENSIONER

(71) Applicant: Cargo Systems, Inc., Elkhart, IN (US)

(72) Inventors: Dallis Lindley, South Bend, IN (US); Kyle Lindley, Niles, MI (US); John M. Armacost, Warsaw, IN (US); David Carpenter, Jaffrey, NH (US)

( * ) Notice: Subject to any disclaimer, the term of this patent is extended or adjusted under 35 U.S.C. 154(b) by 643 days.

(21) Appl. No.: 17/208,840

(22) Filed: Mar. 22, 2021

(65) Prior Publication Data

US 2021/0310294 A1 Oct. 7, 2021

Related U.S. Application Data

(63) Continuation-in-part of application No. 16/031,947, filed on Jul. 10, 2018, now abandoned.

(51) Int. Cl.
*E05F 15/686* (2015.01)

(52) U.S. Cl.
CPC ....... *E05F 15/686* (2015.01); *E05Y 2201/434* (2013.01); *E05Y 2600/46* (2013.01); *E05Y 2900/106* (2013.01)

(58) Field of Classification Search
CPC . E05F 15/41; E05F 15/40; E05F 15/00; E05F 15/681; E05F 15/668; E05F 15/686; E05F 1/1058; E05Y 2201/672
See application file for complete search history.

(56) References Cited

U.S. PATENT DOCUMENTS

| | | | | | |
|---|---|---|---|---|---|
| 2,070,058 | A * | 2/1937 | McCloud | E05F 15/684 | 160/188 |
| 2,923,541 | A * | 2/1960 | Gessell | E05F 15/41 | 160/189 |
| 2,992,819 | A * | 7/1961 | Jackson | E05F 15/686 | 49/28 |
| 3,412,780 | A * | 11/1968 | Moler | E05D 15/24 | 160/209 |
| 4,018,005 | A * | 4/1977 | Harris | E05F 15/673 | 160/188 |
| 4,191,237 | A * | 3/1980 | Voege | E05F 15/686 | 160/188 |
| 4,231,191 | A * | 11/1980 | Ellmore | E05F 15/684 | 49/28 |
| 4,891,908 | A * | 1/1990 | Aquilina | E05F 15/59 | 49/357 |

(Continued)

*Primary Examiner* — Abe Massad
(74) *Attorney, Agent, or Firm* — Crump Law

(57) ABSTRACT

The overhead door lift assembly integrates a traditional torsion spring and an electrically powered operator into a small package mountable in the available head space of conventional tractor trailers, cargo vehicles or other structures. The lift assembly includes a torsion spring counterbalance, electrical operator, and back tension mechanism. The electrical operator uses an electromagnetic clutch and gearbox that couples directly to the cable drums of the counterbalance. The electromagnetic clutch allows the overhead door to be manually raised and lowered in the event of a power interruption or operator malfunction. The back tension mechanism prevents cables from inadvertently unspooling from cable drums as the operator starts to move the overhead door from its horizontal open position to its vertical closed position.

12 Claims, 23 Drawing Sheets

(56) References Cited

U.S. PATENT DOCUMENTS

| | | | | | |
|---|---|---|---|---|---|
| 5,429,170 | A * | 7/1995 | Nogaki | E05D 15/24 160/188 |
| 5,803,149 | A | 9/1998 | Halley et al. | |
| 6,041,845 | A * | 3/2000 | Couch | E05F 15/668 160/209 |
| 6,883,579 | B2 * | 4/2005 | Olmsted | E05D 15/24 160/209 |
| 7,372,225 | B2 * | 5/2008 | Murphy | E05F 15/686 318/445 |
| 8,959,838 | B1 * | 2/2015 | Marinelli | E05B 83/12 292/137 |
| 9,487,984 | B2 * | 11/2016 | Wachtell | E05D 13/1261 |
| 2006/0090861 | A1 | 5/2006 | We | |
| 2006/0191205 | A1 | 8/2006 | Mullet et al. | |
| 2007/0215292 | A1 | 9/2007 | Mullet | |
| 2014/0318719 | A1 | 10/2014 | Hsieh | |

* cited by examiner

OVERHEAD DOOR LIFT ASSEMBLY AND TENSIONER

This application is a continuation-in-part of co-pending application, Ser. No. 16/031,947 filed on Jul. 10, 2018, the disclosure of which is hereby incorporated by reference.

This invention relates to a door lift assembly for raising and lowering overhead doors, and in particular, a door lift assembly used for overhead doors in tractor trailers and cargo vehicles.

BACKGROUND OF THE INVENTION

Overhead doors are commonly used in tractor trailers and cargo vehicles, as well as being used in other applications, such as garage doors. Overhead doors ride along a pair of L-shaped guide channels or tracks between a vertically oriented closed position and a horizontally oriented open position. Traditionally, tractor trailers and cargo vehicles have limited "head room" (the vertical clearance and space required above the door opening, and below the lowest ceiling obstruction) where the overhead door and supporting structures can be located.

In many overhead door applications, torsion spring counterbalances are employed to assist in raising and lowering overhead doors. Torsion spring counterbalances are typically mounted to the header above the door opening and provide a degree of lifting force to counter the weight of the door. The torsion spring counterbalance generally consists of cables wound about cable drums mounted to a shaft and a torsion spring operatively mounted over and tensioned about the shaft. While useful and convenient for most applications, torsion spring counterbalances simply assist in manually raising and lowering overhead doors.

Powered door lifts are commonly used to raise and lower overhead doors. In garage door applications, the typical powered door lift, commonly referred to as a garage door opener or operator, includes a power unit that contains the electric motor, a track attached to the power unit, and a trolley that rides back and forth on the track and is connected to the garage door by an arm. The trolley is pulled along the track by a chain, belt, or screw that turns when the motor is operated. Since the entire assembly hangs above the garage door, garage door openers occupy useable space, which is particularly undesirable in tractor trailer and cargo vehicles.

Another type of powered door lift consists basically of a cable winch that winds and unwinds cables around a shaft mounted to cable drums to raise and lower the doors. The cable winch is mounted within the structure and is operatively connected to the lift or counterbalance shaft. Often tractor trailers and cargo vehicles lack the headroom to accommodate a winch type powered door lift. Another major drawback to winch type powered door lifts is that the overhead door cannot be manually raised or lowered if the winch malfunctions or electrical power is interrupted without disconnecting the door from the cables. Winch type door lifts also tend to have the cables "unspool" from the cable drums in the absence of cable tension. Due to the mass of the door and its static inertia in the horizontal open position, overhead doors tend to remain at rest as the winch begins to unwind the cables. If the door does not immediately begin to move, cable tension is lost. In the absence of cable tension, the resilient memory of the cables will cause the cables to "unspool" and become tangled or bound around the cable drums.

The design and geometry of sectional garage doors also contributes to issues in the practical use of automated door lift assemblies. Sectional doors are one of the most common style of over head door and are made up of panel sections that are connected with hinges. As the door opens and closes, wheels at the edge of each panel roll inside the guide track on each side of the door opening. As each hinge panel moves through the curved portion of the guide tracks, the lifting force needed to effectively move the door varies and oscillates due to the geometry of each flat panel moving between the vertical and horizontal sections of the track. Similarly, the back tension forces also vary and oscillate as each panel moves between the vertical and horizontal sections of the track. Typically, conventional lift assemblies accommodate the variances and oscillations in required lift forces; however, conventional lift assemblies heretofore have not accommodated variancies and oscillations in the required back tension forces to prevent "unspooling" as each panel moves through the curved portion of the guide tracks.

SUMMARY OF THE INVENTION

The overhead door lift assembly of this invention integrates a traditional torsion spring and an electrically powered operator into a small package mountable in the available head space of conventional tractor trailers, cargo vehicles or other structures. The torsion spring counterbalance provides the majority of the lifting force for lift assembly, but the electric operator is used to actuate the raising and lowering of the overhead door. The electrical operator uses an electromagnetic clutch and gearbox that couples directly to the cable drums of the counterbalance. The electromagnetic clutch allows the overhead door to be manually raised and lowered in the event of a power interruption or operator malfunction. The gearbox is coupled directly to one of the cable drums of the counterbalance to drive the counterbalance shaft and each connected cable drum. The operator can be triggered by wired electrical switches or wireless handheld devices. The lift assembly also includes a back tension mechanism that prevents cables from inadvertently unspooling from cable drums as the operator starts to move the overhead door from its horizontal open position to its vertical closed position. The back tension mechanism provides a slight force to immediately pull the overhead door back towards the closed position keeping enough tension on the cables around the cable drums.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
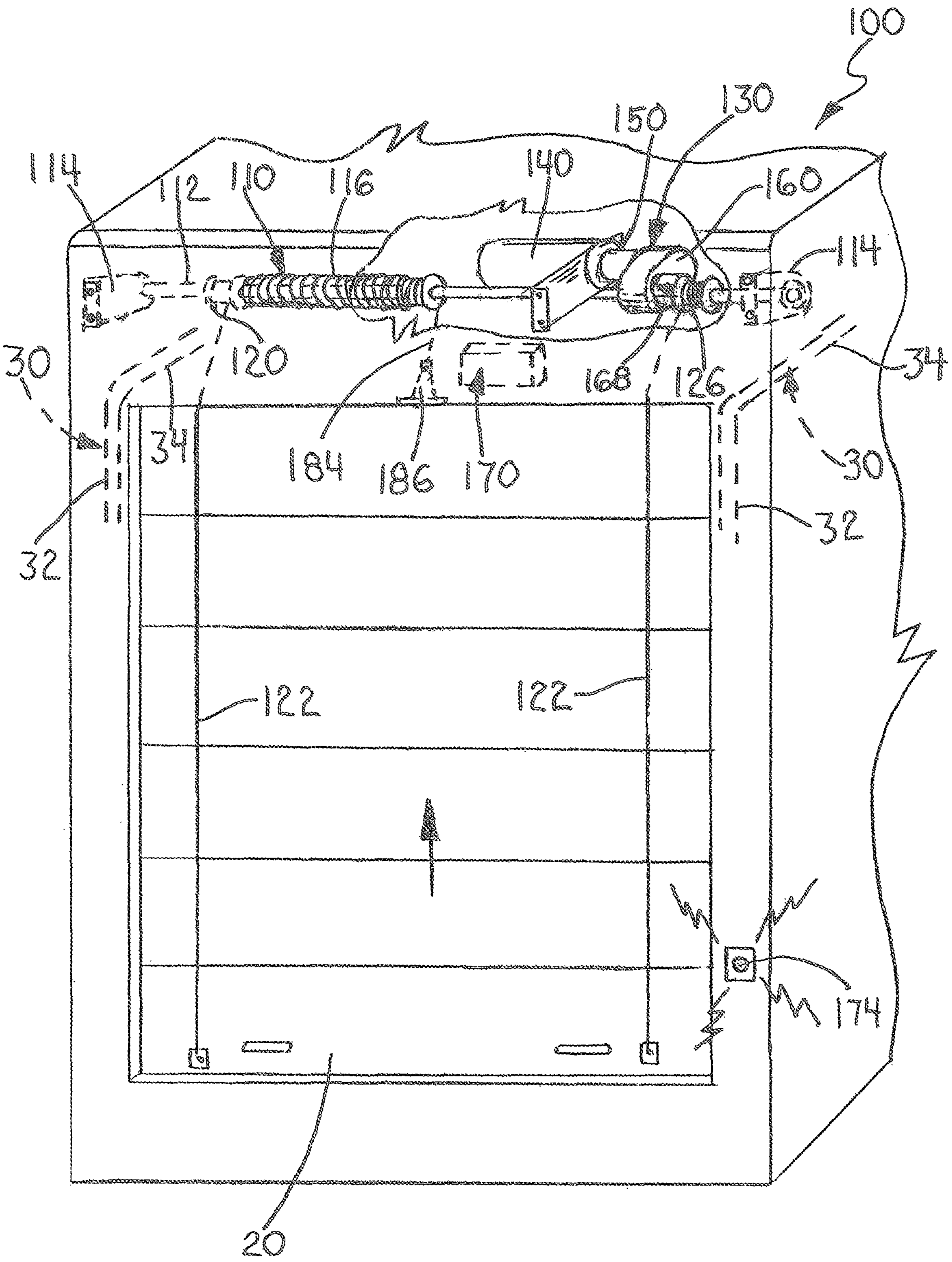
FIG. 1 is a partial perspective view with portions cut away of an exemplary embodiment of the door lift assembly of this invention incorporated into the overhead door of a trailer shown with the door in the vertical closed position.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-16 illustrate an exemplary embodiment of the electric door lift assembly of this invention, which is designated generally as reference numeral 100. Door lift assembly 100 is used to raise and lower overhead doors between a vertical closed position and a horizontal open position. As shown, lift assembly 100 includes a traditional torsion spring counterbalance 110, an electric operator 130 and a back tension mechanism 190. Electric operator 130 uses an electromagnetic clutch and gearbox that couples directly to the cable drums of the counterbalance in a compact footprint.

Door lift assembly 100 can be used in a variety of structures, but is particularly well suited for use in overhead door applications where headroom is limited, such as in tractor trailers and box trucks. Headroom is the vertical clearance and space required above the door opening, and below the lowest ceiling obstruction, required for proper installation and operation of the door and its hardware. For simplicity of illustration and explanation, door lift assembly 100 is illustrated in the drawings in use with a conventional overhead door 20 of a tractor trailer or box truck 10.

As shown, door 20 moves between a vertical lowered position, which encloses the door opening and a horizontal raised position stowed within the trailer interior underlying the trailer ceiling. Door 20 rides along a pair of guide channels 30 mounted to the trailer's frame structure within the trailer interior. Guide channels 30 are mounted to the framework of the trailer, which generally include a frame or jams (not shown) around the door opening and header 40. Header 40 traverses across the top of the door opening and beneath the trailer ceiling and between the trailer sidewalls. Header 40 typically defines the headroom available for operator 100 as well as providing the support structure upon which the operator is suspended. Each guide channel 30 has a vertical track 32 and a horizontal track 34 and an arcuate transition therebetween. Door 20 has a plurality of track rollers 22 seated within the guide channels 30.

Torsion spring counterbalance 110 provides the majority of the lifting force for door 20. Counterbalance 110 includes a torsion spring 116 mounted to a horizontal drive shaft 112, and a pair of straps or cables 118 wound around cable drums 120 mounted to the drive shaft. Brackets 114 affix drive shaft 112 to header 40 or other available components of the frame structure and suspend horizontally within the trailer interior above the door opening and guide channels 30. Drive shaft 110 is secured to header 42 by a pair of mounting brackets 112. Cable drums 120 are mounted at opposite ends of drive shaft 110 and secured by drum set screws (not shown).

Cables 118 are connected to the bottom of door 20 and wound around cable drum 120 in one direction, generally over the top.

Cable drums 120 are of conventional design and of the type used in conventional torsion spring counterbalance systems. Conventional cable drum 120 includes a central hub with an axial opening for receiving shaft 112 and a pair of spaced annular flanges that extend radially around the hub. In addition, cable drums 120, like other conventional drums, have two or more raised bosses 122 spaced around the hub ends, through which set screws are turned to engage shaft 112.

As best shown in FIGS. 1-4, electric operator 130 is operatively connected to counter balance 110 to directly drive one of the cable drums 120 fixed to shaft 112. Electric operator 130 includes an electric motor 140, electromagnetic clutch 150, gearbox 160 and an electronic controller 170. Operator 130 is mounted to header 40 by a bracket 132, which positions the motor parallel to shaft 112 within the available head space adjacent the shaft.

Electric motor 140 is of conventional motor design. Electromagnetic clutch 150 operatively connects motor 150 to gearbox 160. Clutch 150 operates electrically but transmits torque mechanically. Cycling is achieved by interrupting the electrical current through the electromagnet plate of the clutch. When clutch 150 is actuated, current flows through the electromagnet producing a magnetic field. A rotor portion 152 in clutch 150 becomes magnetized and sets up a magnetic loop that attracts an armature 154 within the clutch. Armature 154 is pulled against rotor 152 and a frictional force is generated at contact. Within a relatively short time, the load is accelerated to match the speed of the rotor, thereby engaging the armature and the output shaft 156 of clutch 150. When current is removed from clutch 150, the armature is free to turn with the shaft.

Gearbox 160 transfers rotational movement from motor 130 directly to one of cable drums 120. Gearbox 160 includes two meshing spur gears 162 and 164 enclosed in a protective housing 166. Gear 162 is mounted axially around the drive shaft of clutch 150. Gear 164 is mounted axially over shaft 112 and turns freely about the shaft. A drum coupling 168 affixed to gear 164 operatively connects gearbox 160 to one of two cable drums 120. Coupling 168 extends from gear 164 through gear housing 166 and axially over shaft 112 to engage cable drum 120. Coupling 168 has a number of keyed protrusions or prongs 169 that slide axially over the hub ends of cable drum 120 between bosses 122. Prongs 169 seat between bosses 122 over the hub end to provide a positive operative engagement between the gear box 160 and cable drum 120.

Figure 2:
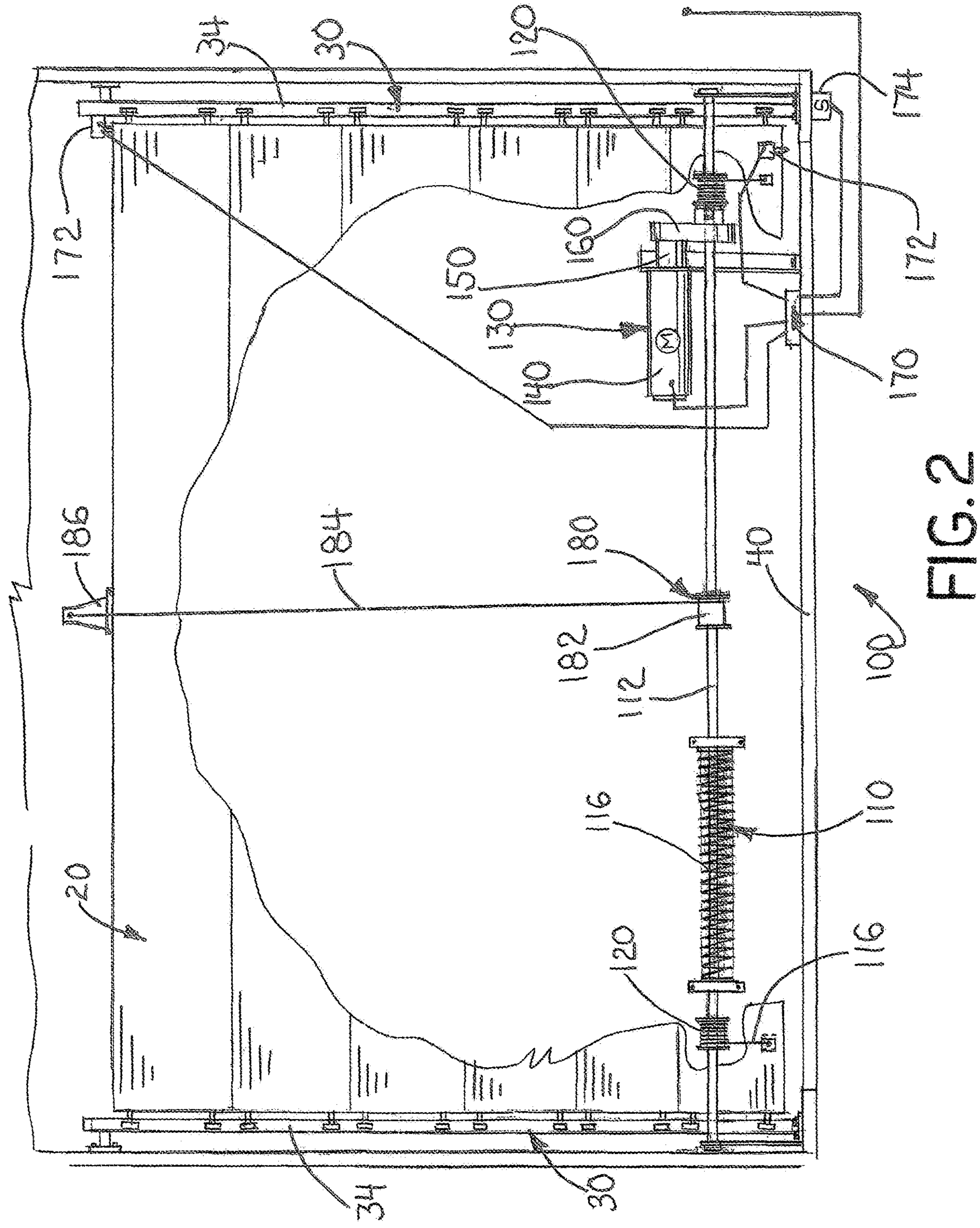
FIG. 2 is a top view of the door lift assembly of FIG. 1 shown with the door in the horizontal open position.
Figure 3:
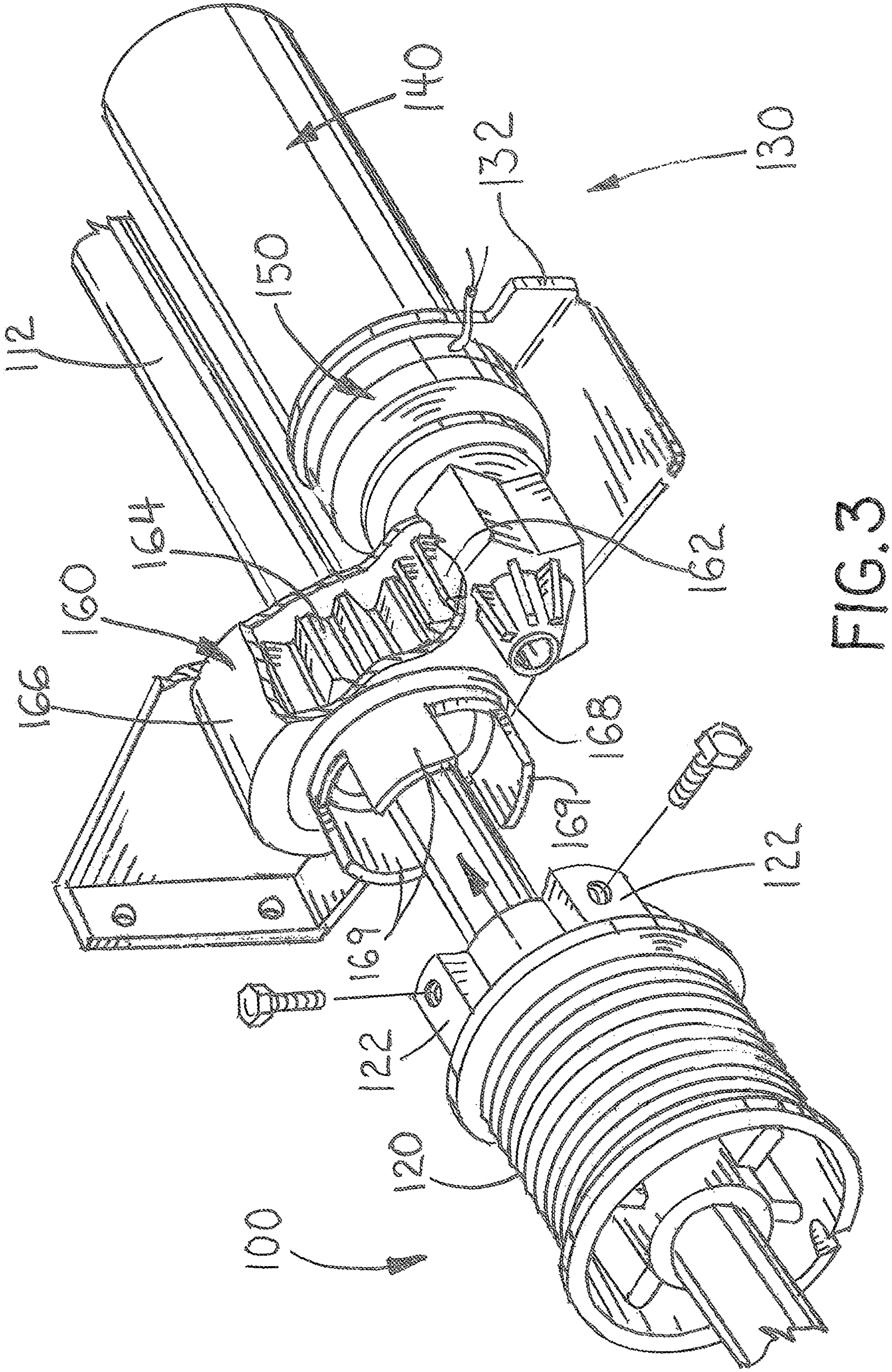
FIG. 3 is a partial exploded perspective view of the door lift assembly of FIG. 1 showing the electric operator with the cable drum and shaft of the counterbalance.
Figure 4:
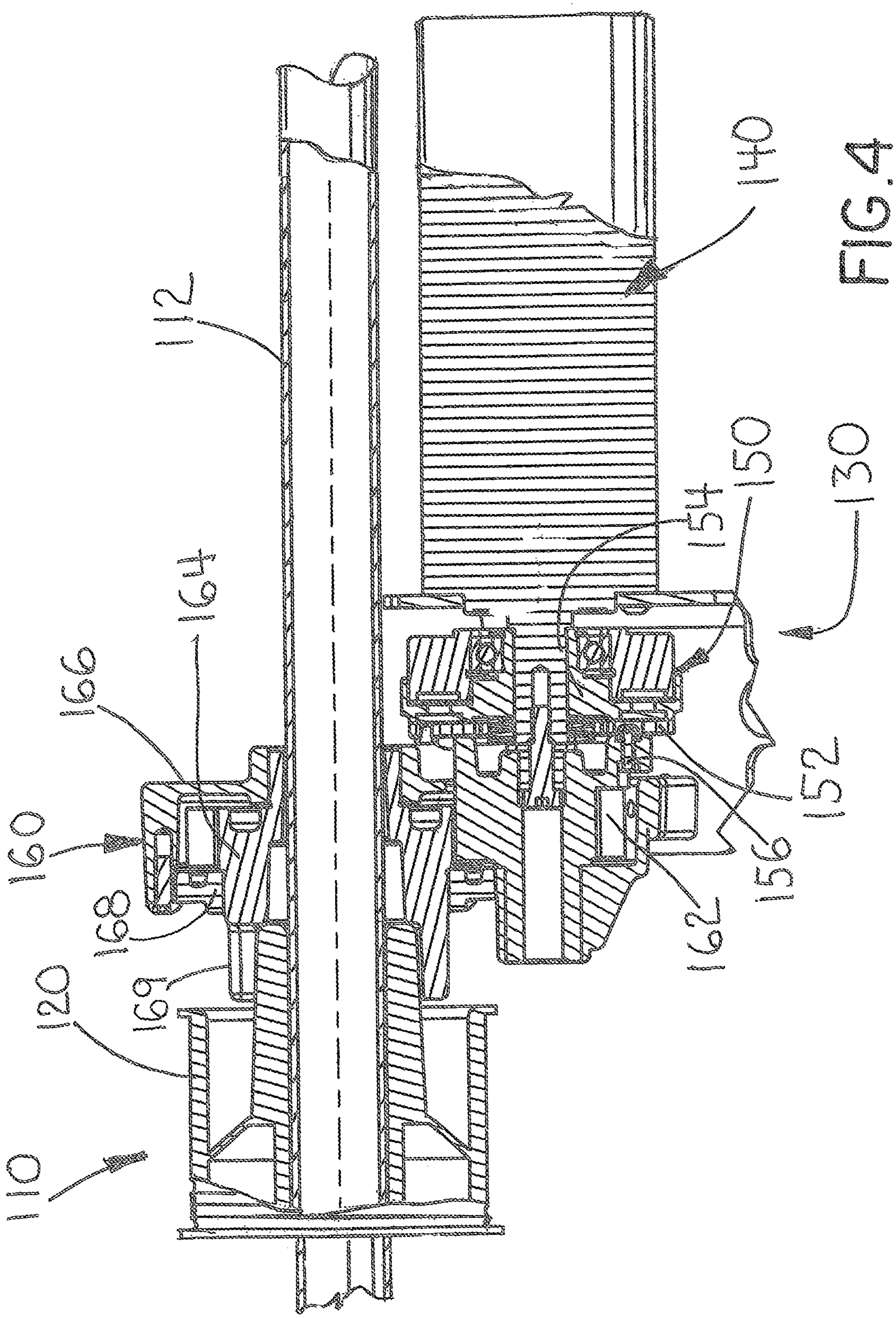
FIG. 4 is a partial top sectional view of the electric operator with the cable drum and shaft of the counterbalance.
Figure 5:
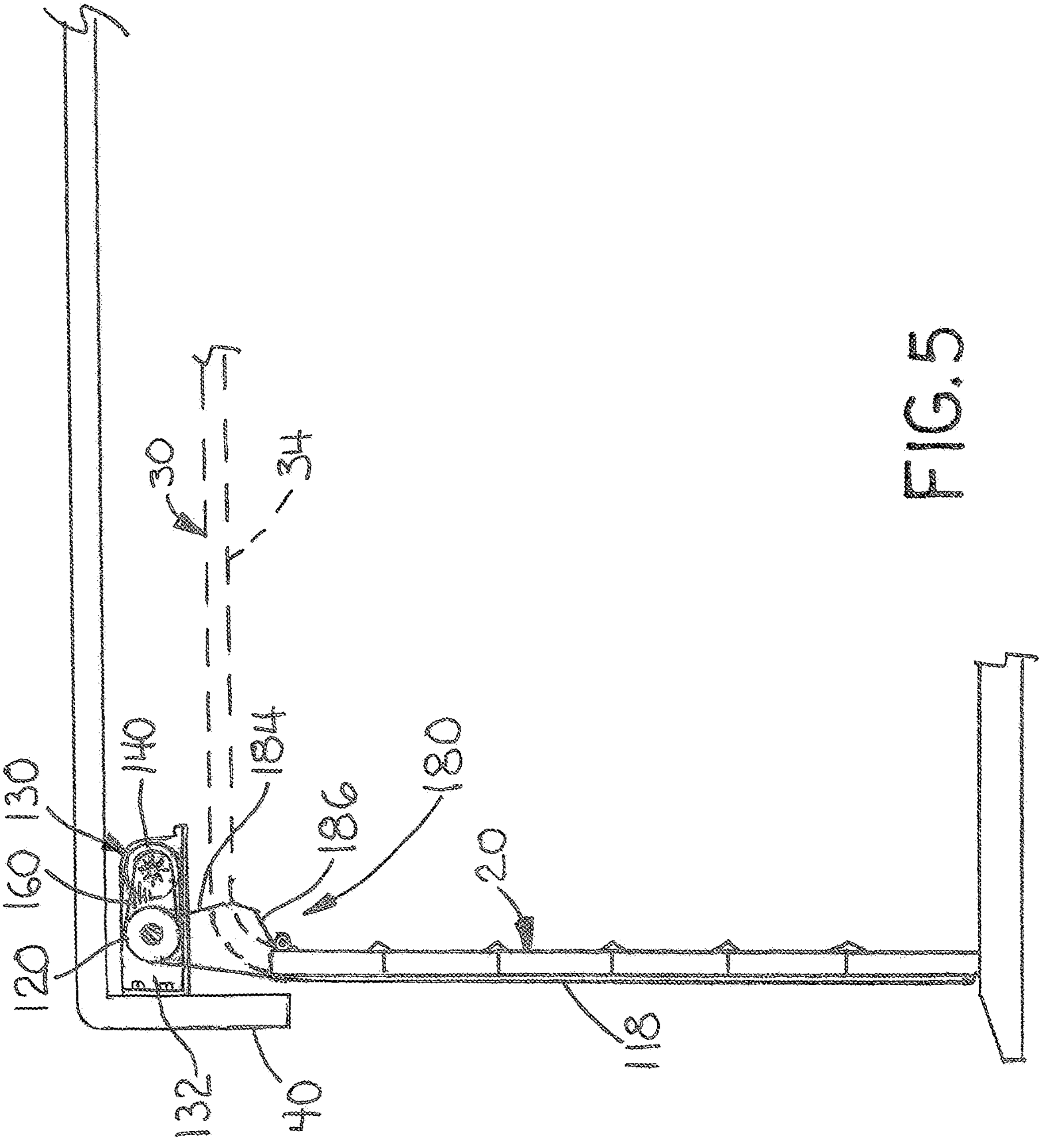
FIG. 5 is a simplified partial side view of the door lift assembly of FIG. 1 illustrating the cables winding on the counterbalance with the door in the vertical closed position.

As shown in FIGS. 1 and 2, controller 170 is mounted to header 40 and powered by the available electrical source, typically a DC source of the trailers or vehicles or an AC source in fixed structures. Both motor 140 and clutch 150 are wired to an electronic controller 170, which is used to actuate operator 130. Various position sensors 172 are used to detect the position of door 20 and trigger the deactivation of motor 40. Position sensors 172 may take any conventional form and are well known in the electro-mechanical arts. Activation switches 174 are wired to controller 170 and conveniently located on the exterior and/or interior of the trailer to actuate operator 130 to raise and lower door 20. Controller 170 may also incorporate a wireless signal module, so that operator 130 can be actuated by a handheld fob or remote device 176. Typically, radio frequency (RF) is used in such wireless systems, but other similar technologies may be incorporated in alternative embodiments.

Figure 14:
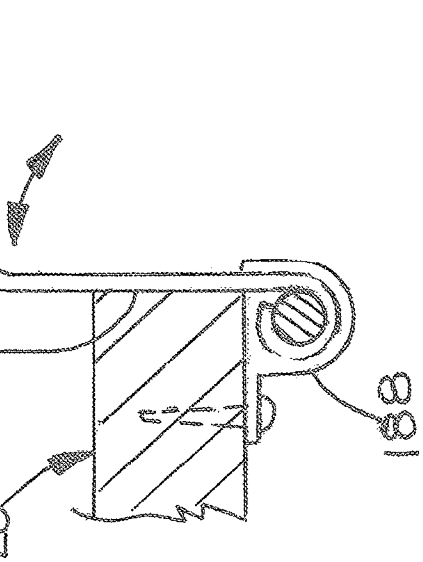
FIG. 14 is an enlarged view of an area of FIG. 13.

As best shown in FIGS. 12-16, back tension mechanism 180 prevents cables 118 from inadvertently unspooling from cable drums 120 as operator 130 starts to move door 20 from the horizontal open position to the vertical closed position. Back tension mechanism 180 provides a slight force to immediately pull door 20 back towards the closed position keeping enough tension on cables 118 around cable drums 120 to prevent unspooling. Back tension mechanism 180 includes a third cable drum 182 mounted to shaft 112, a third strap or cable 184 wound in the opposite direction around the cable drum and connected to the top of door 20 by a hinged tension arm 186. Cable drum 182 is mounted to shaft 112 using set screws between cable drums 120. Tension arm 186 is pivotally mounted to door 20 by bracket 188. Tension arm 186 is bent to form a hockey stick shape and have a contact segment 187 that is adapted to abut the top edge of door 20. Cable 184 is wound to cable drum 182 and connected to tension arm 186 so that arm 186 pivots away from door 20 and hangs under its own weight when the door is in the vertical closed position (FIG. 15) and buts against the edge of the door when the door is in the horizontal open position (FIG. 14).

Figure 6:
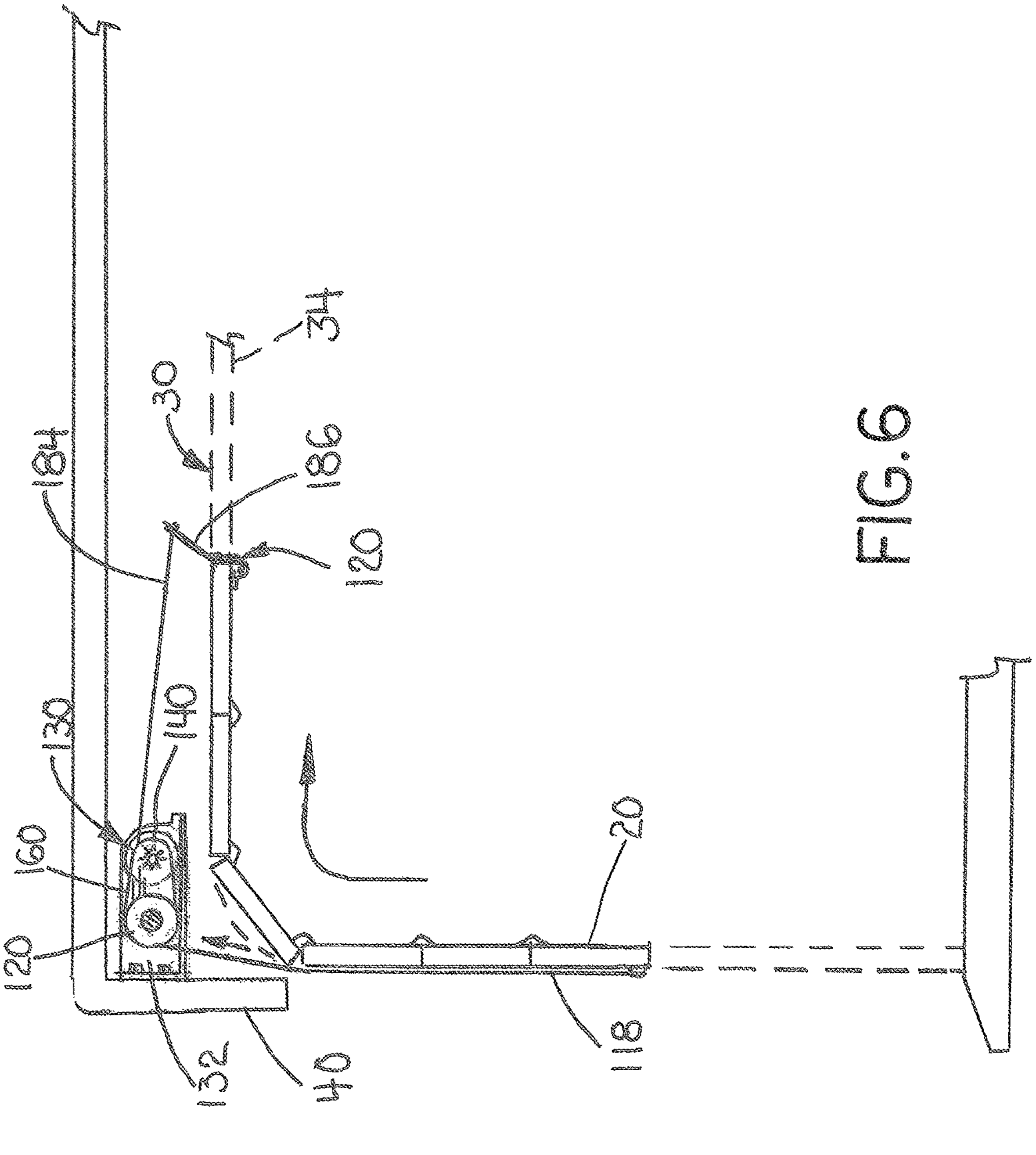
FIG. 6 is a simplified partial side view of the door lift assembly of FIG. 1 illustrating the cables winding around the cable drum with the door partially opened.
Figure 7:
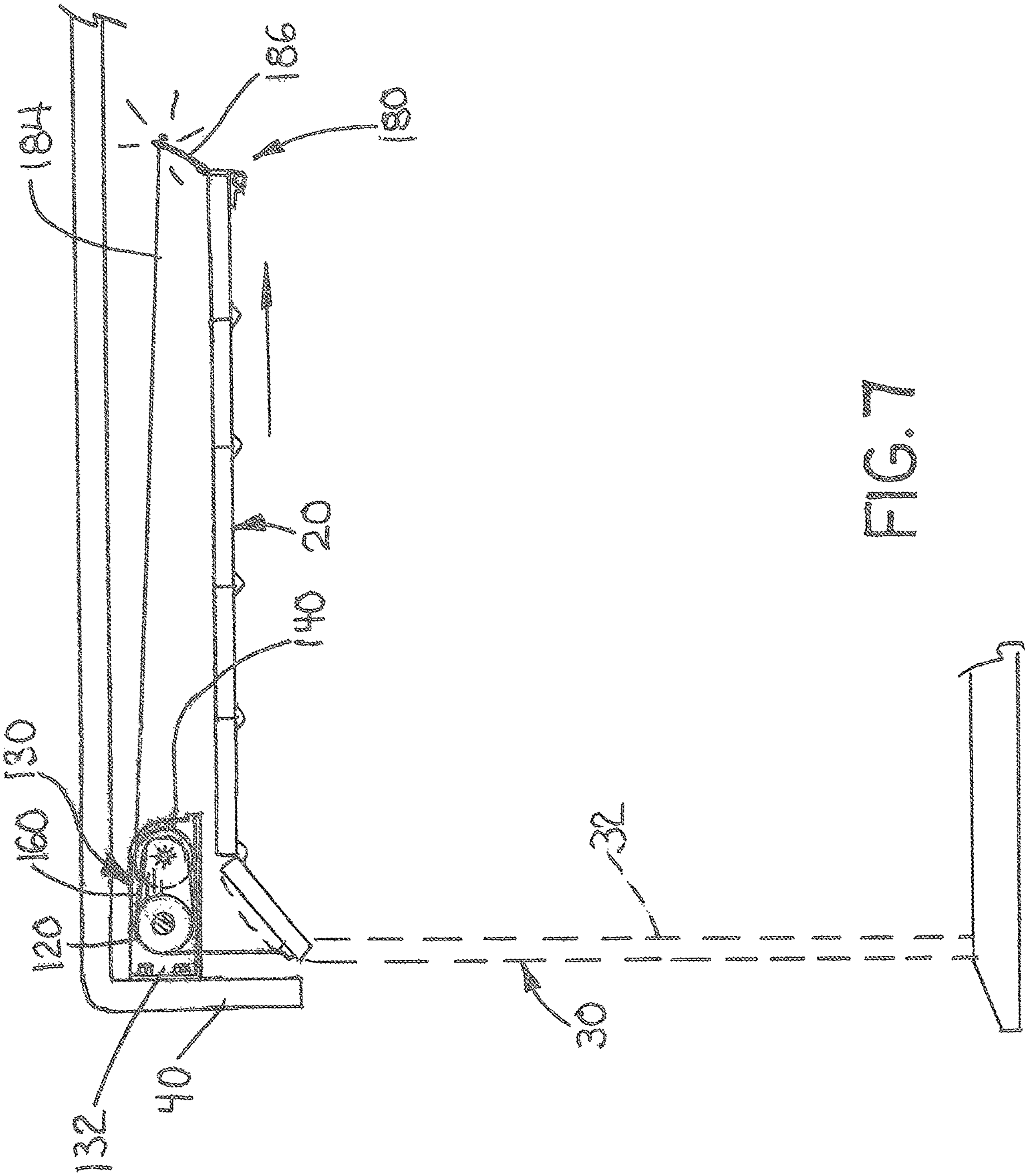
FIG. 7 is a simplified partial side view of the door lift assembly of FIG. 1 illustrating the cables winding around the cable drum with the door in the horizontal open position.
Figure 8:
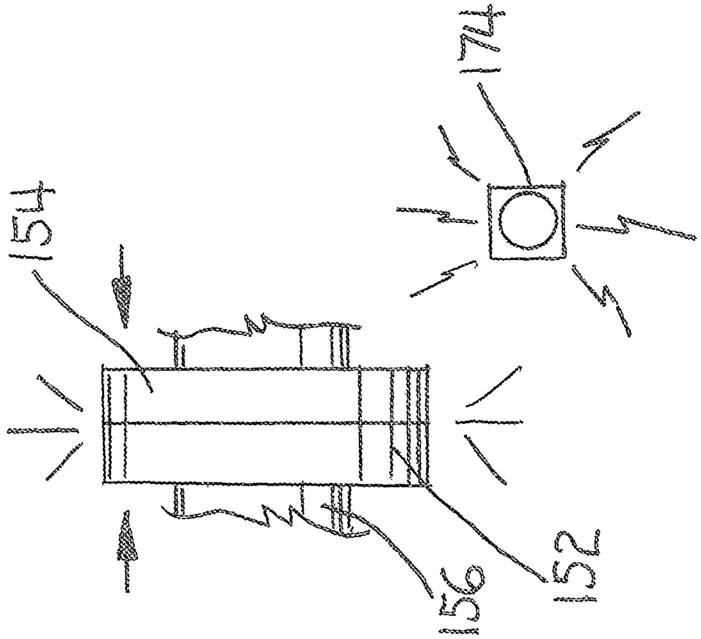
FIG. 8 is a simplified side view of the electromagnetic clutch used in the operator of the door lift of FIG. 1 shown in the energized state.

In operation, counterbalance 110 and operator 130 work in conjunction to raise and lower door 20 between the closed and open positions (FIGS. 6-8). Spring 116 of counterbalance 110 provides the majority of the force needed to raise and lower door 20. Operator 130 provides the additional force and is used to actuate the movement of the door between the open and closed positions. Controller 170 provides electrical power to motor 140 and electromagnetic clutch 150. Controller 170 energizes electromagnetic clutch 150 so that rotational movement of the motor drive shaft is transferred into gearbox 160. Gearbox 160 is directly coupled to one of cable drums 120. With both cable drums 120 and 184 secured to shaft 112, motor 140 drives all three cable drums 120 and 182 and shaft 112 through clutch 150 and gear box 160. An electronic signal from switch 174, handheld fob or remote 176 triggers controller 170 to actuate motor 140 to turn gearbox 160 in either direction to raise or lower door 20. Motor 140 turns in one direction to wind cables 118 around cable drums 120 raising door 20 to the horizontal open position, and turns in the opposite direction to unwind cables 118 from drums 120 lowering door 20 to the vertical closed position.

Figure 9:
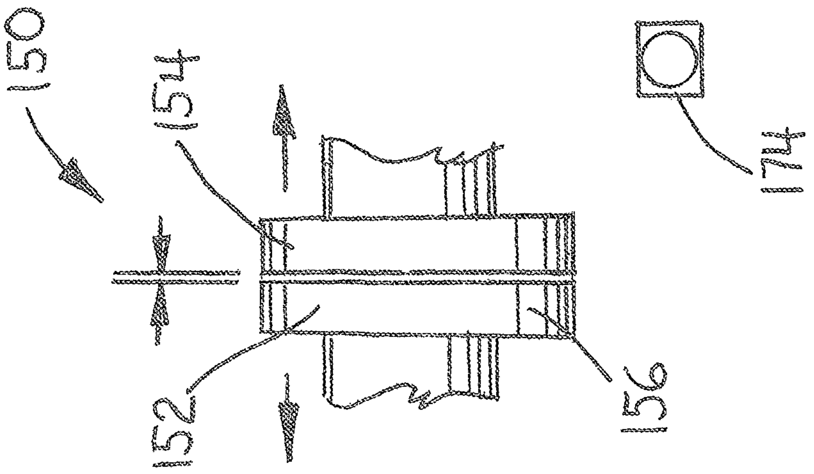
FIG. 9 is a simplified side view of the electromagnetic clutch used in the operator of the door lift of FIG. 1 shown in the de-energized state.
Figure 10:
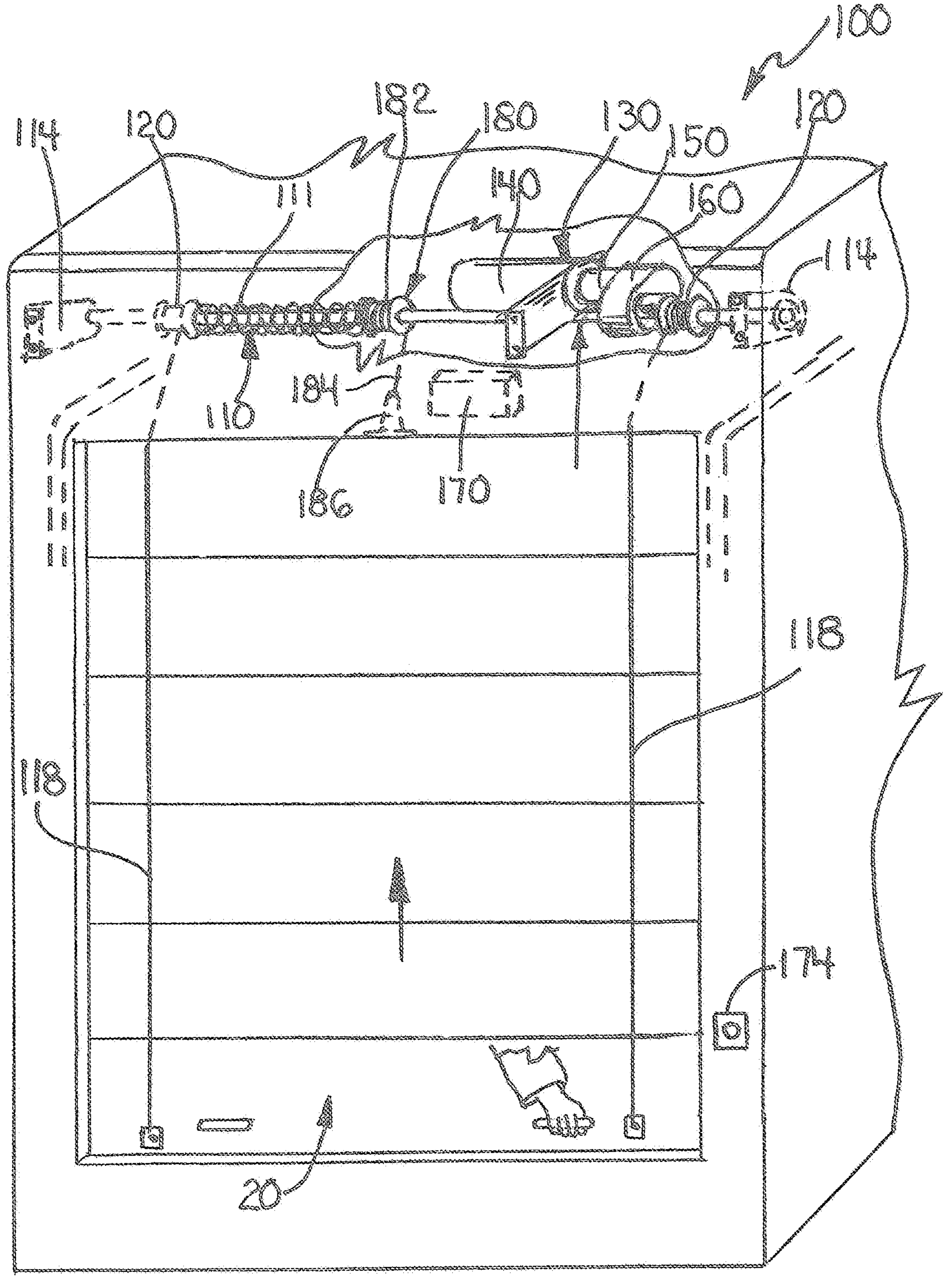
FIG. 10 is another partial perspective view with portions cut away of an exemplary embodiment of the door lift assembly of this invention incorporated into the overhead door of a trailer showing the door being manually raised due to a power interruption.
Figure 11:
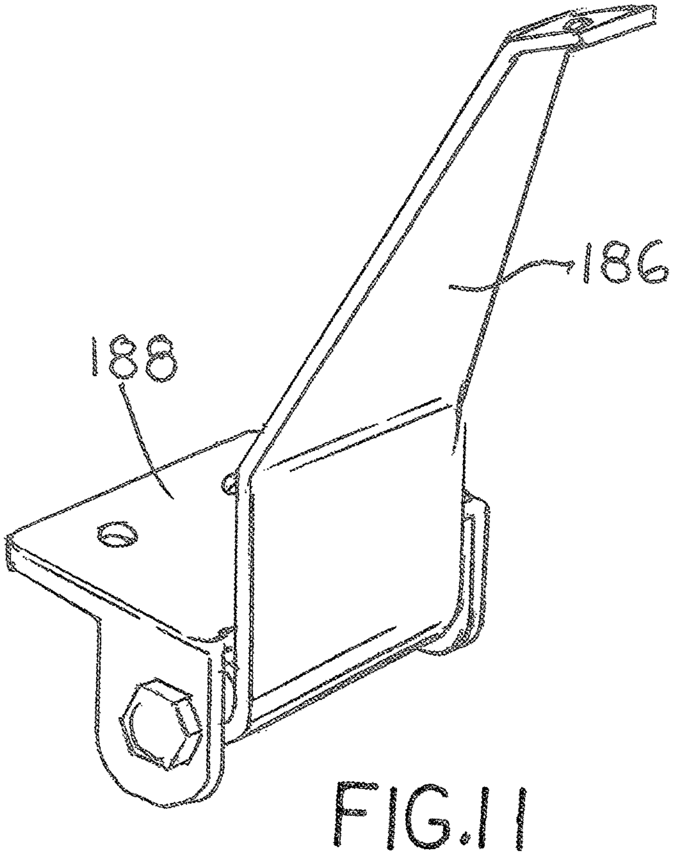
FIG. 11 is a perspective view of the tension arm used in the back tension mechanism of FIG. 1.
Figure 12:
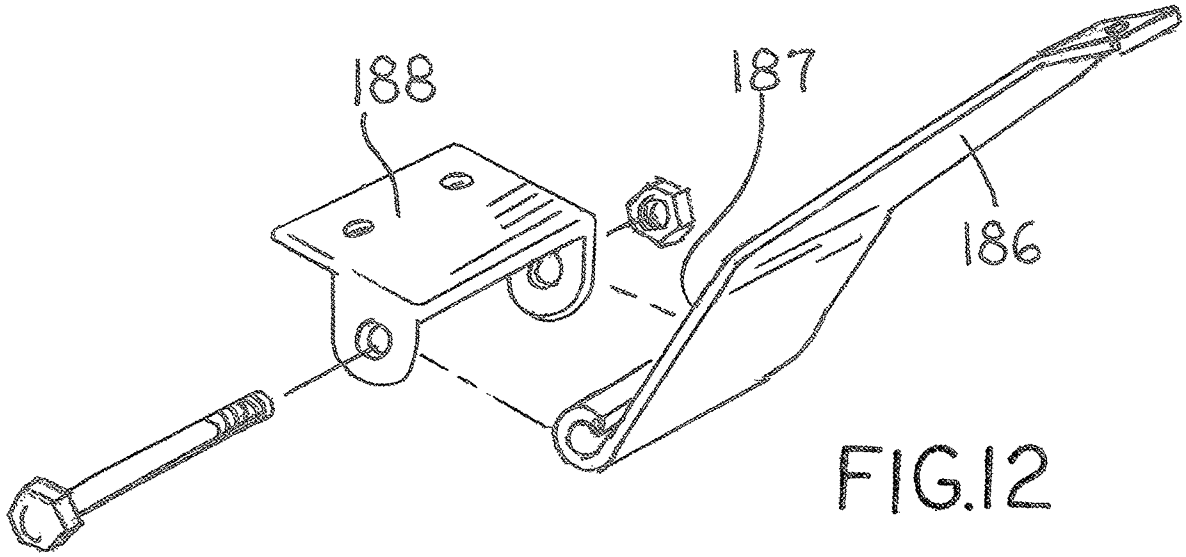
FIG. 12 is an exploded view of the tension arm of FIG. 11.
Figure 13:
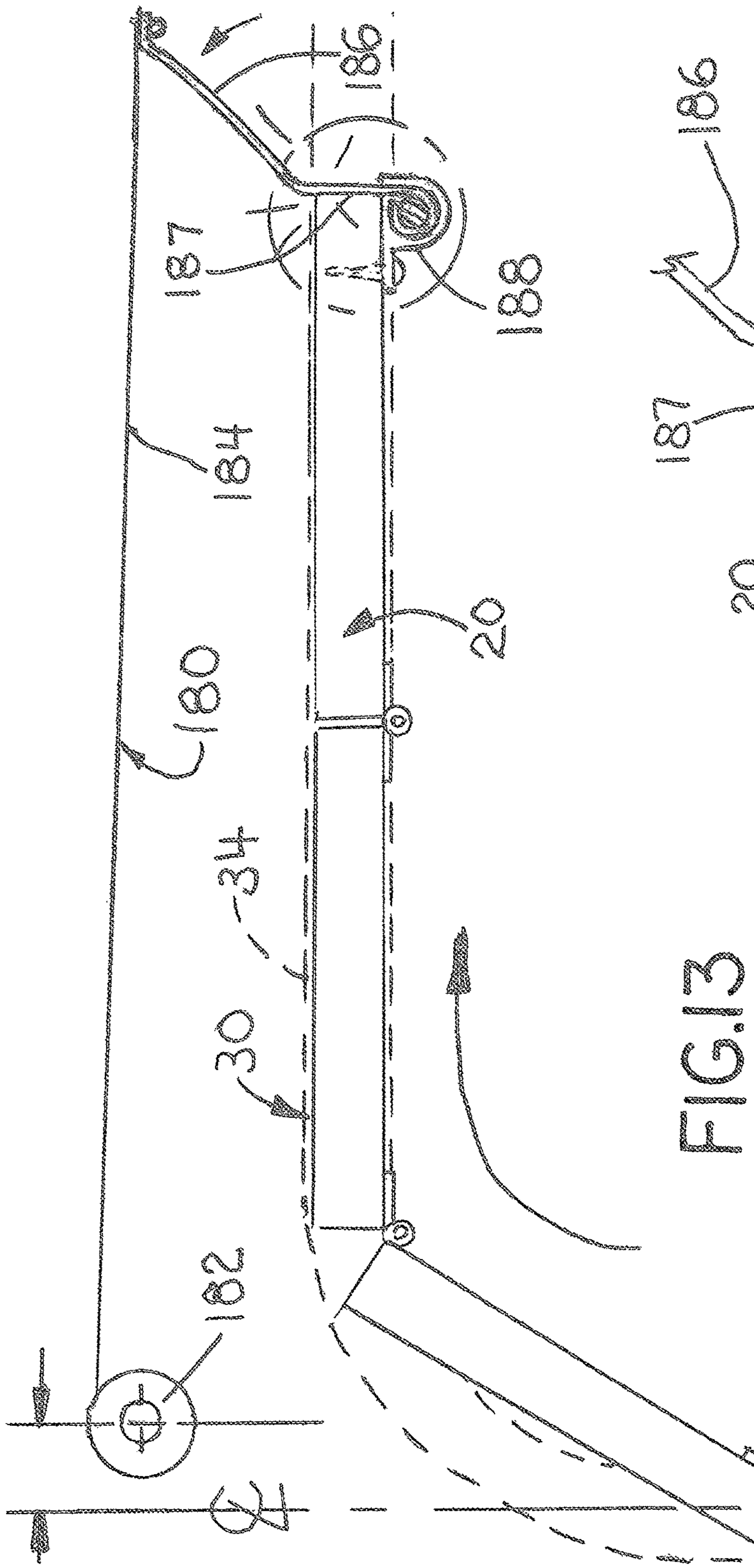
FIG. 13 is a simplified side view of the back tension mechanism used in the door lift assembly of FIG. 1 showing the overhead door moving from the horizontal open position.

As shown in FIGS. 9-11, electromagnetic clutch 150 allows door 20 to be manually raised and lowered independently of operator 130 in the event of a power interruption or motor failure. In the event that electrical power to operator 130 is interrupted, electromagnetic clutch 150 de-energizes allowing rotor 152 and armature to rotate independently disconnecting motor 140 from gearbox 160. During such a power interruption, counterbalance 110 still provides mechanical assistance for manually raising and lowering door 20. Consequently, door lift assembly 100 is never fully inoperative due to power failure or motor malfunction.

Figure 15:
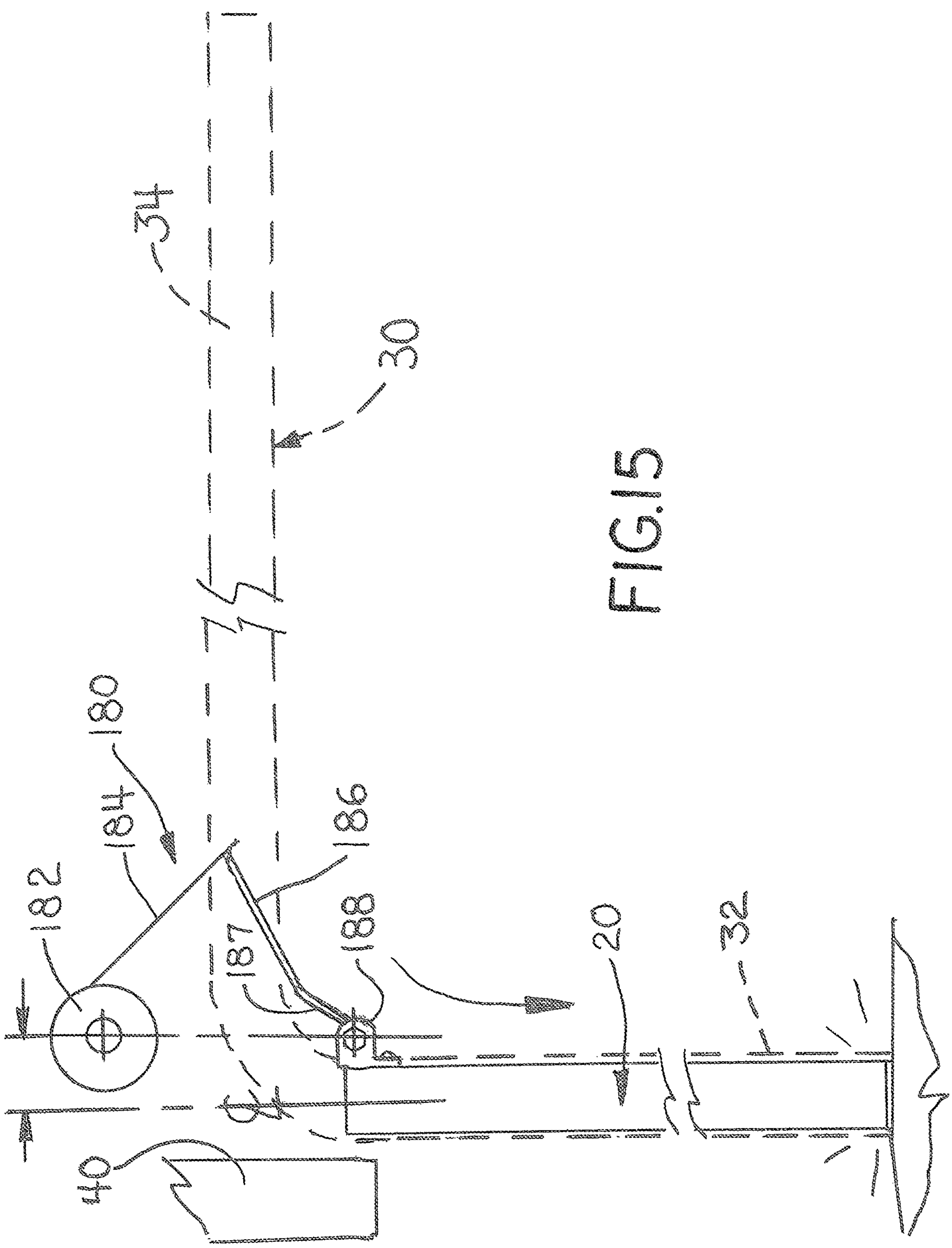
FIG. 15 is a simplified side view of the back tension mechanism used in the door lift assembly of FIG. 1 showing the overhead door in the vertical closed position.
Figure 16:
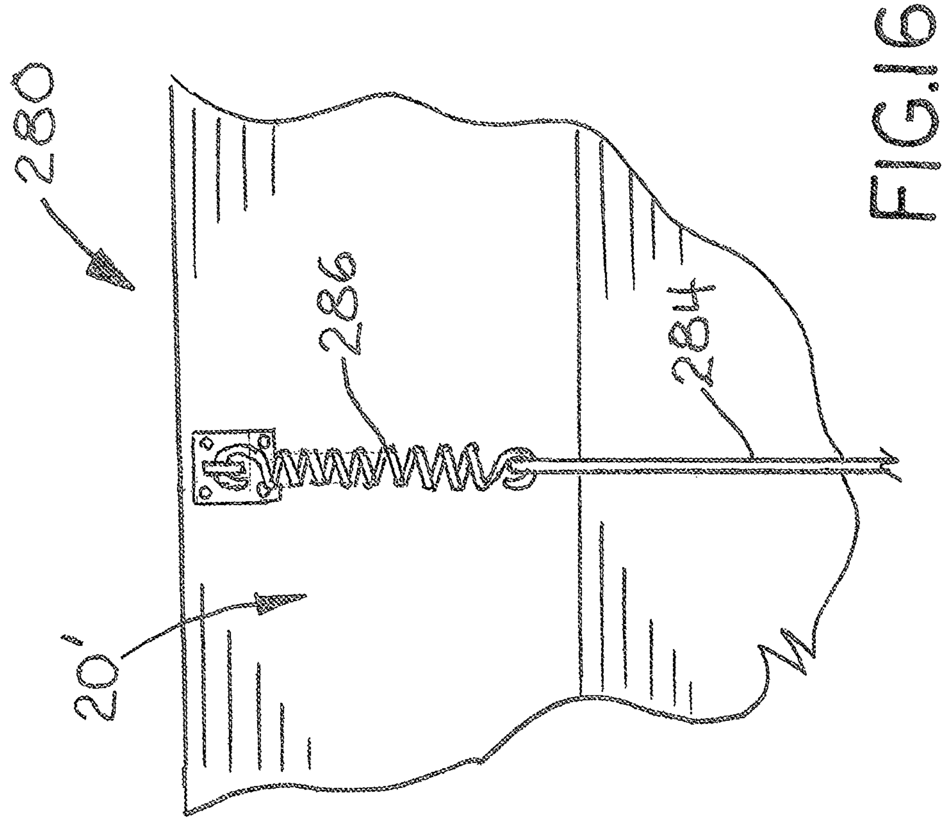
FIG. 16 is a partial top view of an alternative embodiment of the back tension mechanism used in the door lift assembly of this invention.
Figure 17:
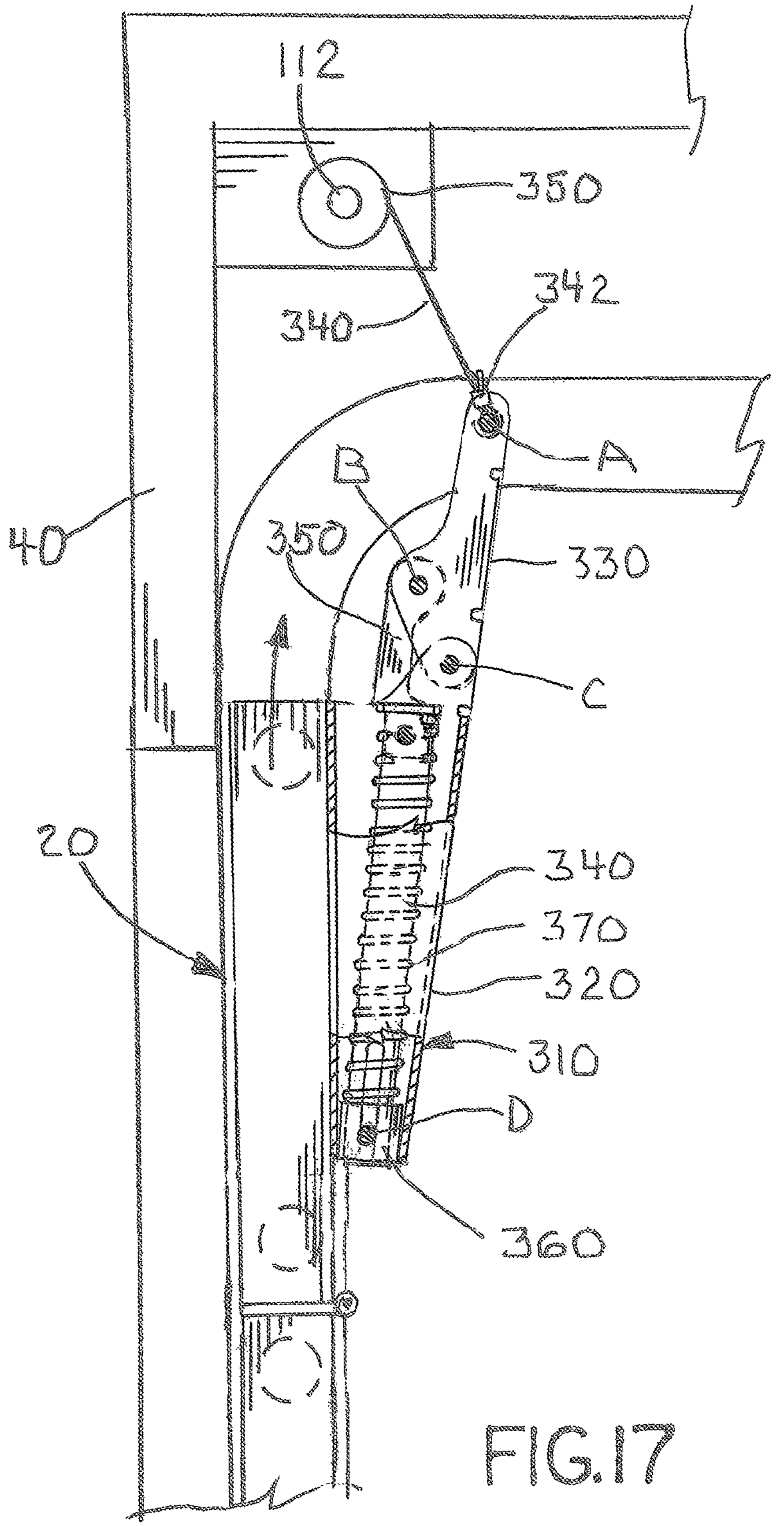
FIG. 17 is a simplified side view of a third exemplary embodiment of the back tension mechanism used in the door lift assembly of this invention.

As shown in FIGS. 12-15, back tension mechanism 180 operates to prevent cables 118 from unspooling as operator 130 moves door 20 from the horizontal open position to the vertical closed position. When moving door 20 from the open position to the closed position, cables 118 are unwound from cable drums 120, and cable 184 winds around drum 182. Conversely, when moving door 20 from the closed position to the open position, cables 118 are wound onto cable drums 120, and cable 184 is unwound from drum 182. Tension arm 186 is mounted to door 20 to have an "over center" position so that the weight of the arm itself tensions cable 184 (FIG. 15). As door 20 moves into the horizontal open position, tension arm 186 pivots and abuts against the edge of the door pulling cable 184 from cable drum 182 (FIGS. 14 and 15). As door 20 starts to move from the open position to the closed position, cable drum 182 immediately begins to wind cable 184 pulling the door back along horizontal track 34 (FIG. 14). In the vertical closed position, tension arm 186 is pivoted away from the edge of door 20 (FIG. 16). The tension on cable 184 created by tension arm 186 provides enough force to over come the inertia in the system and the rotation of cable drum 182 pulls door 20 toward the closed position preventing cables 118 from unspooling.

FIG. 16 illustrates an alternative embodiment of back tension mechanism 280, which can be incorporated into the door lift assembly of this invention. Back tension mechanism 280 uses a similar third cable drum (not shown) and cable 284 as in the previously described embodiment, but includes a coil spring or length of elastic cord 286 connecting the end of the cable to door 20. In the open position, cable 284 is unwound from the cable drum and spring 286 is stretched slightly to tension cable 284. The tension force on cable 284 is sufficient to urge door 20 moving toward the closed position when the operator actuates, overcoming inertia caused by the weight of door 20' lying in the horizontal track. By providing a slight "push," back tension mechanism 280 prevents cables 118 from unspooling.

FIGS. 17-26 illustrates a third alternative embodiment of the back tension mechanism, of this invention, which is designated generally as reference numeral 300. Back tension mechanism 300 is incorporated into door lift mechanism 100 again to prevent cables 118 from inadvertently "unspooling" from cable drums 120 as operator 130 starts to move door 20 from the horizontal open position to the vertical closed position. Back tension mechanism 300 includes a tensioner 310, which uses a spring loaded piston action to accommodate the variance and oscillations in the required back tension forces as the door moved between the open and closed position and as each of the door panel moves through the curved portion of the guide tracks. Back tension mechanism 300 includes a tensioner 310 mounted to the top of door 20, a third cable drum 380 mounted to shaft 112, a third strap or cable (the "tension cable") 390 wound around cable drum 380 and connected to tensioner 310. Again tension cable 320 is wound in the opposite direction around cable drum 380. Tensioner 310 is fastened at the top edge of the interior surface of door 20.

Figure 18:
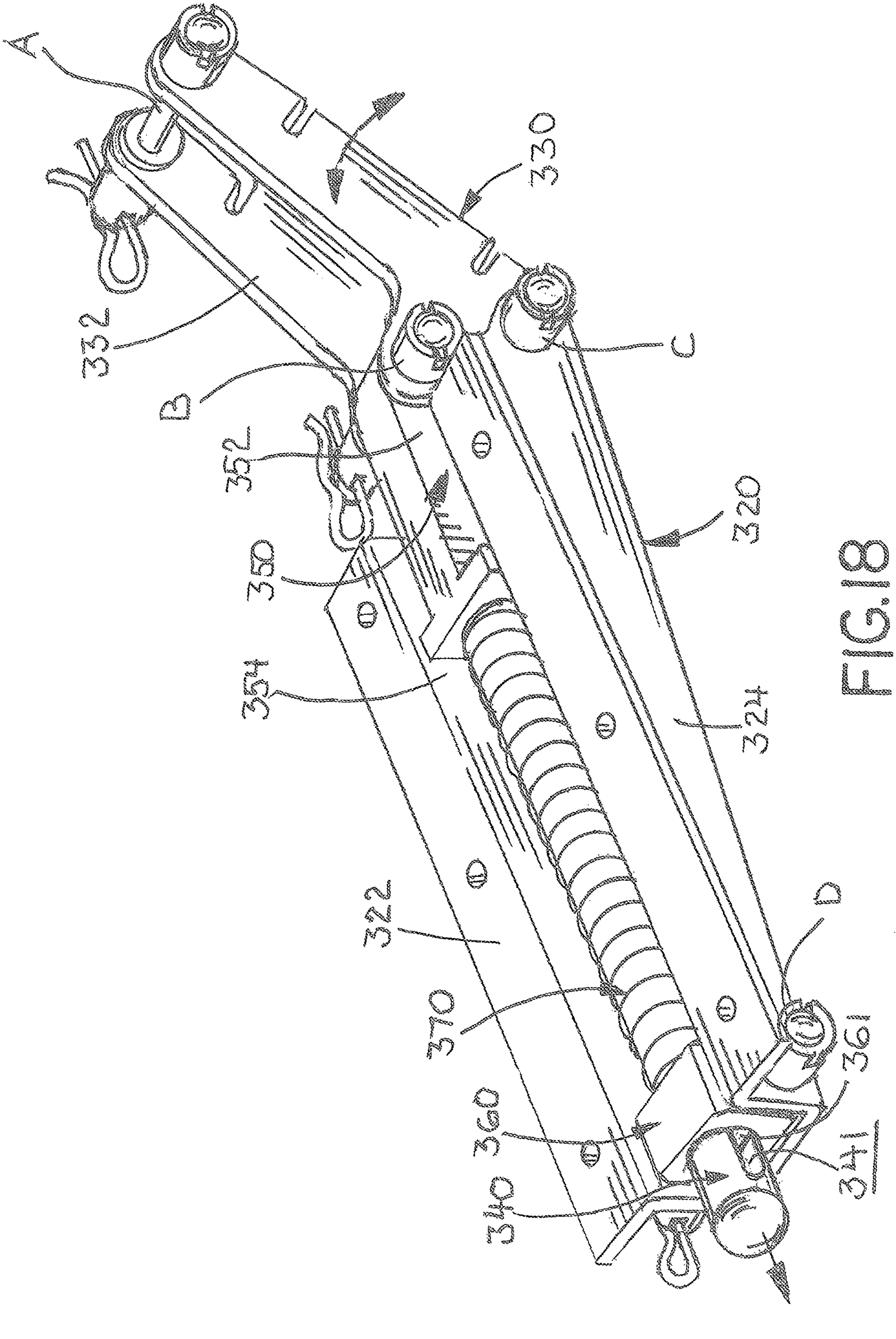
FIG. 18 is a perspective view of the tensioner of the back tension mechanism of FIG. 17.
Figure 19:
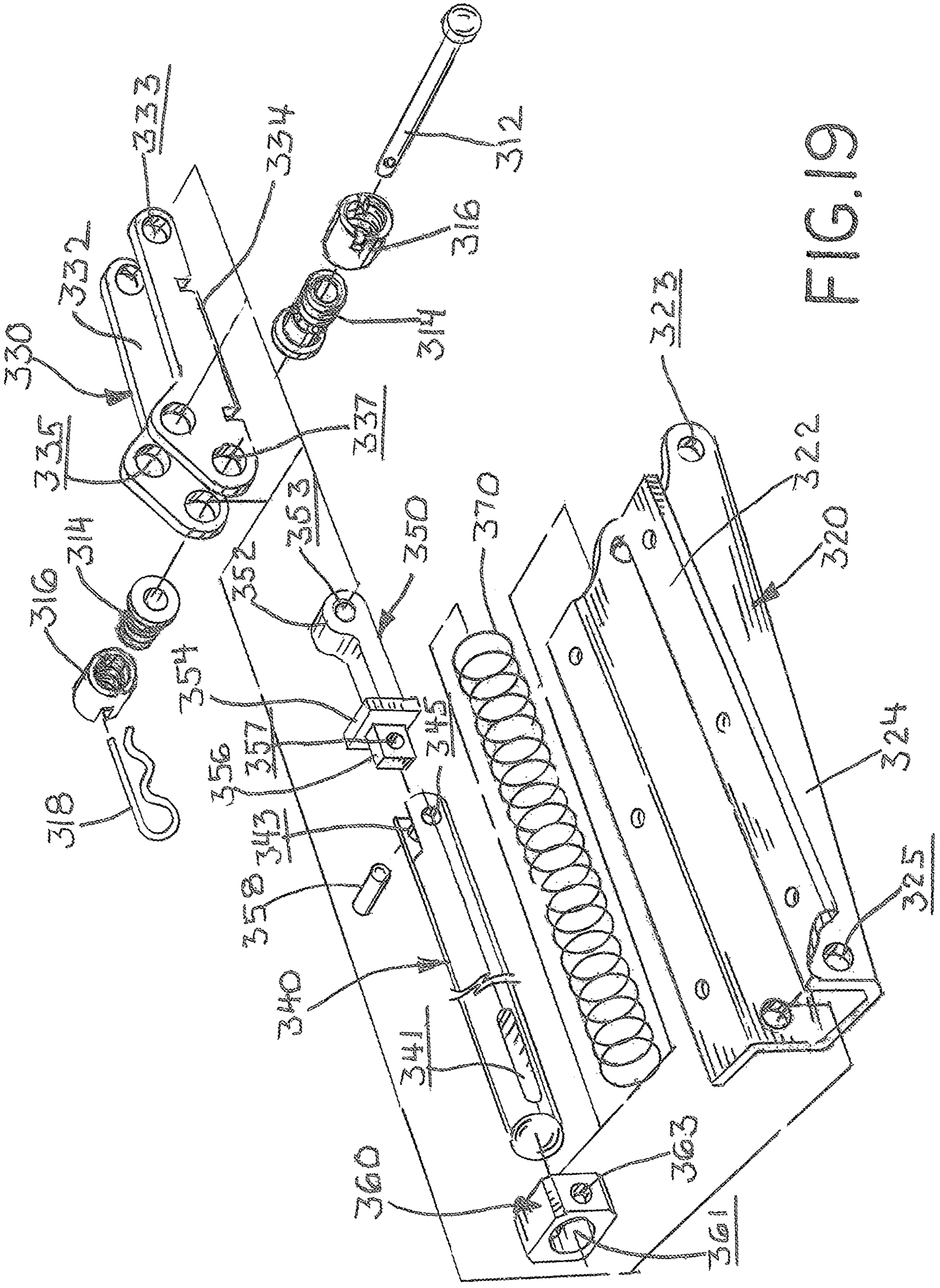
FIG. 19 is an exploded view of the tensioner of FIG. 17.
Figure 20:
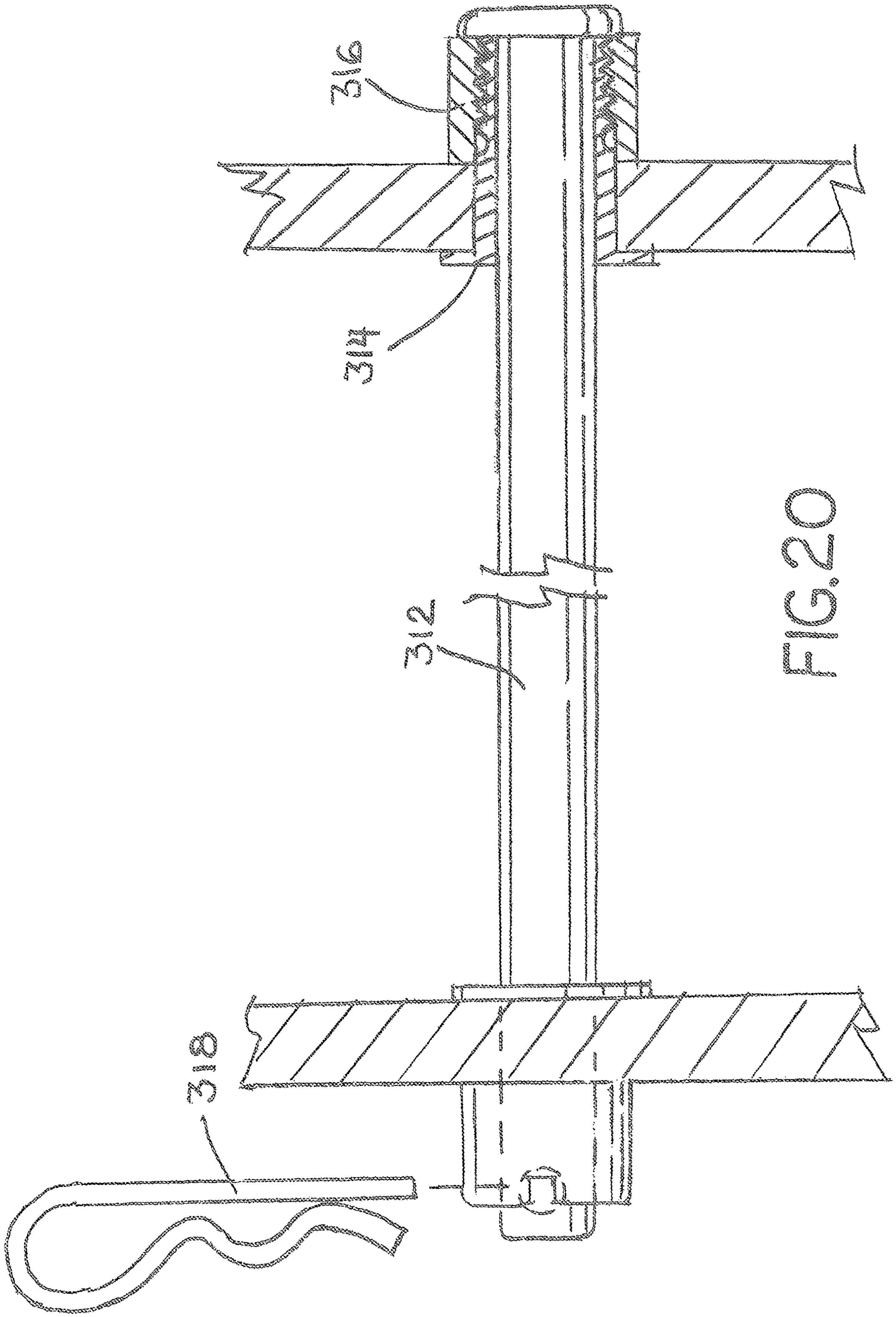
FIG. 20 is an exemplary end sectional view of one of the pivot points of the tensioner of FIG. 17.
Figure 21:
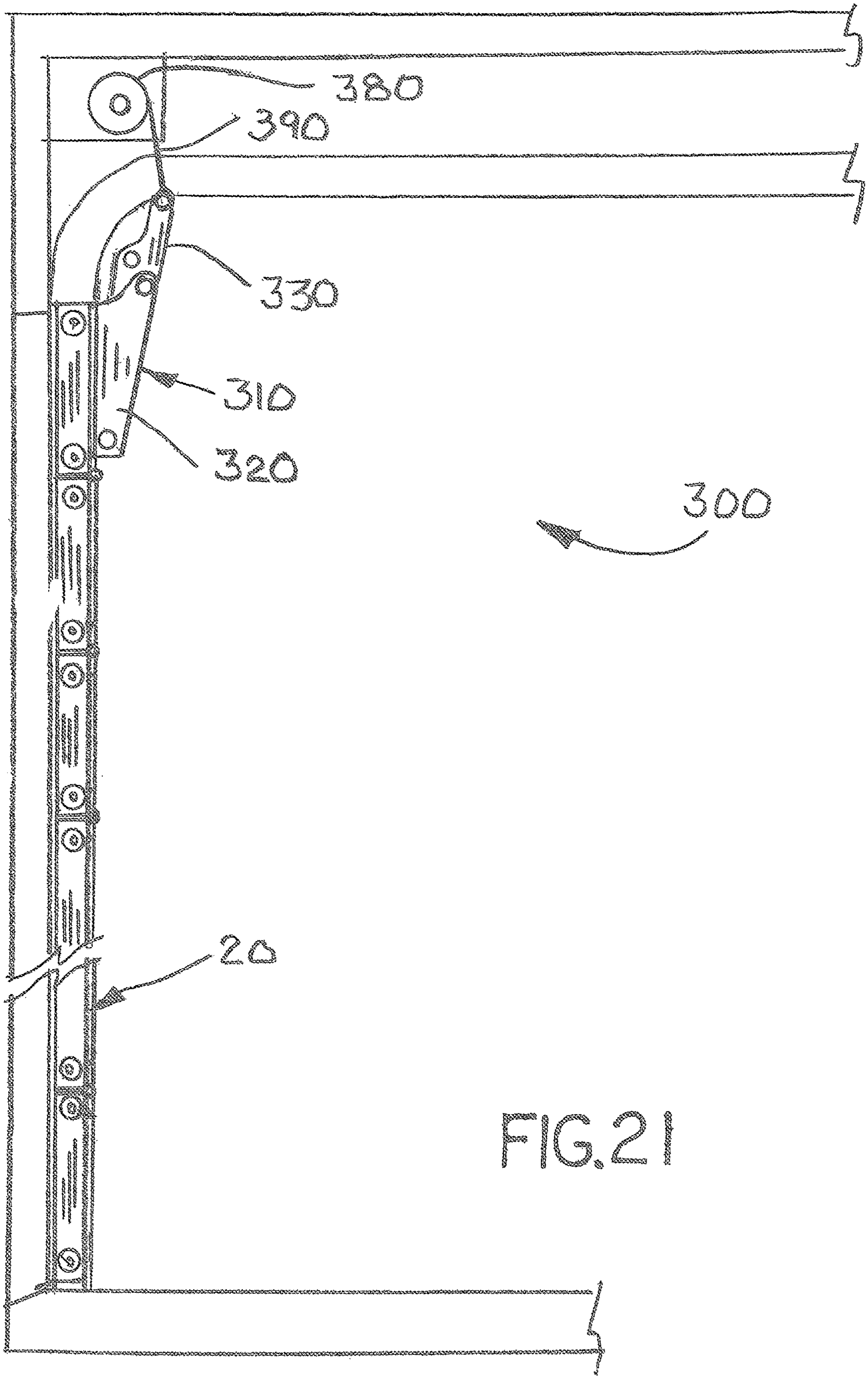
FIG. 21 is a simplified side view of the back tension mechanism of FIG. 17 used in the door lift assembly showing the overhead door in the vertical closed position.
Figure 22:
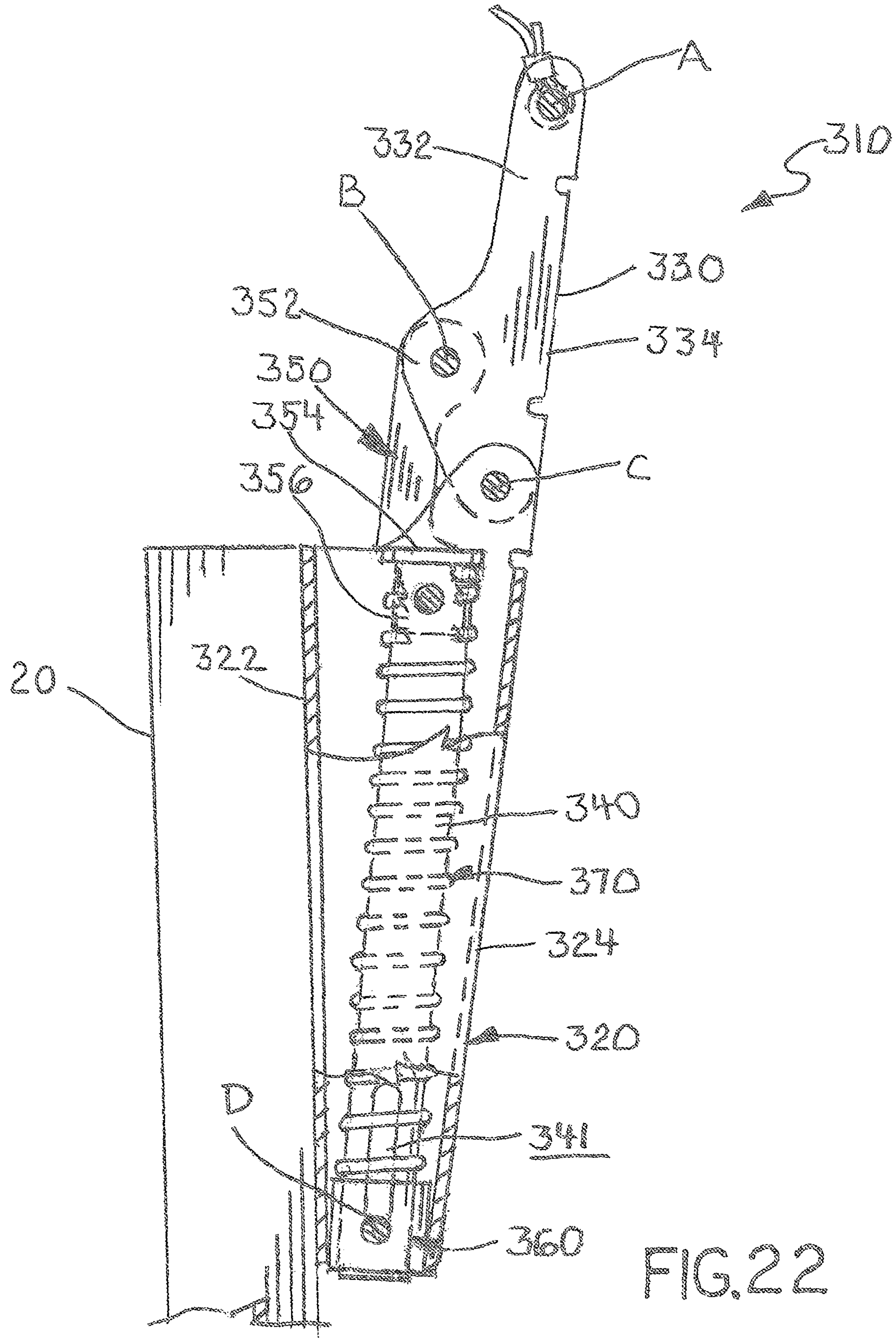
FIG. 22 is another side view of the tension of the back tension mechanism of FIG. 17 used in the door lift assembly showing the overhead door in the vertical closed position.
Figure 23:
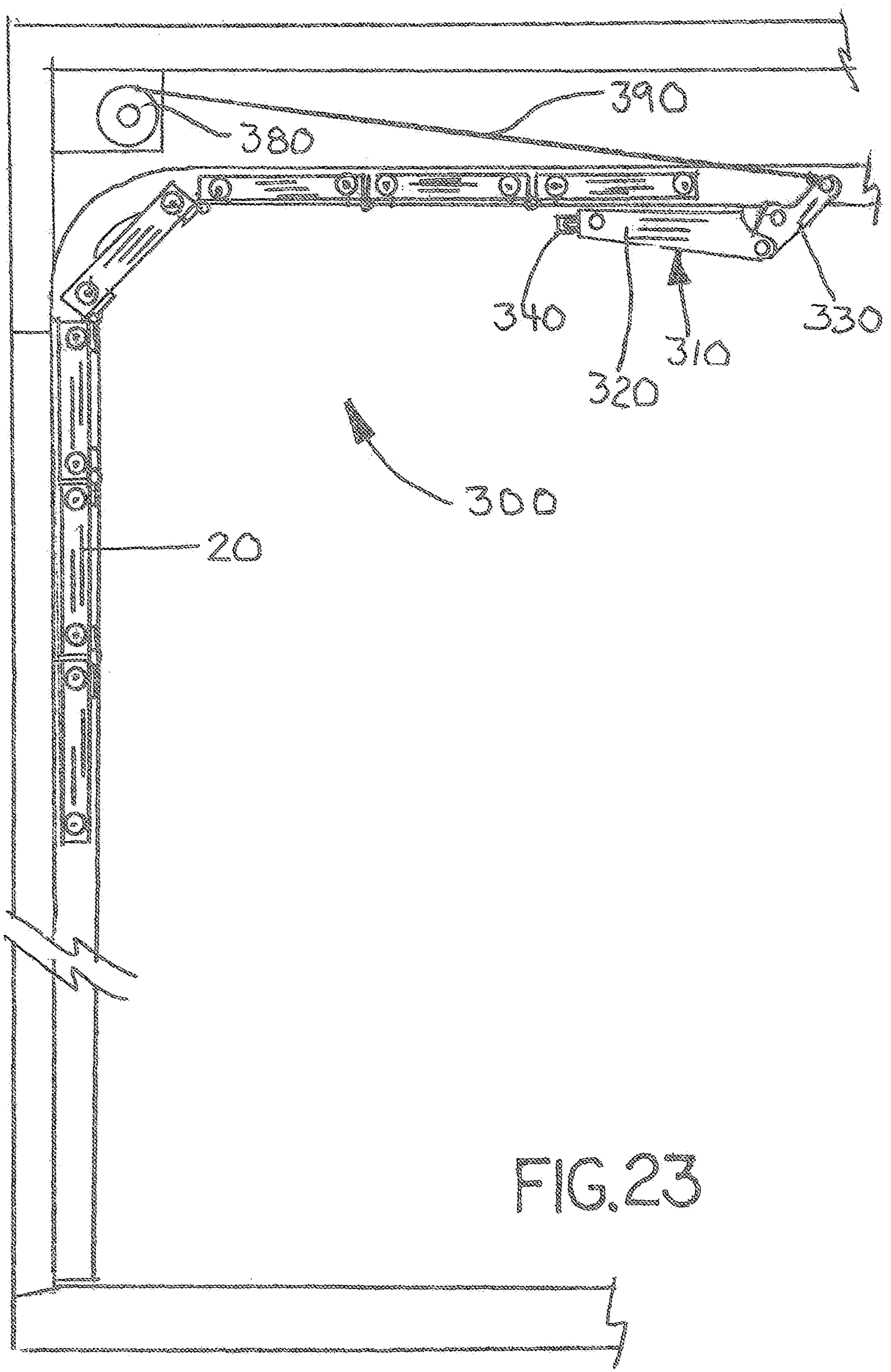
FIG. 23 is a simplified side view of the back tension mechanism of FIG. 17 used in the door lift assembly showing the overhead door moving between the vertical closed position and the horizontal open position.
Figure 24:
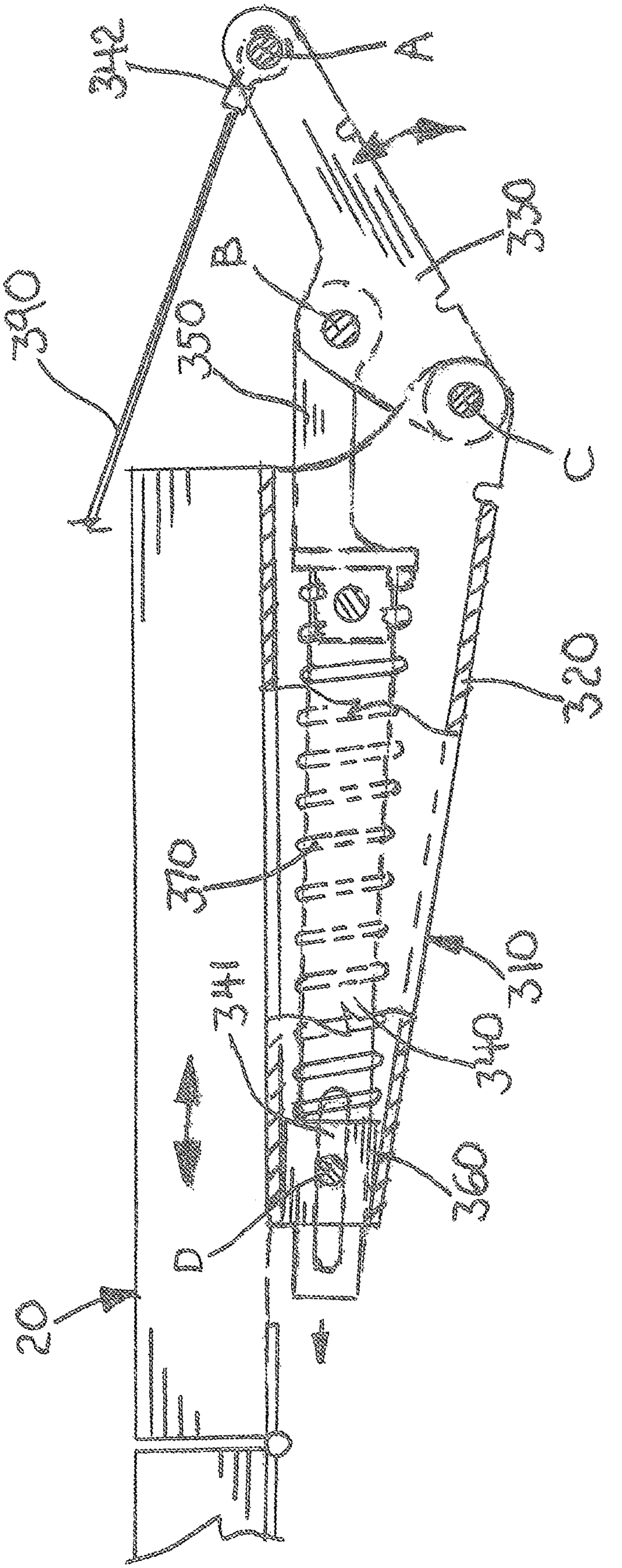
FIG. 24 is another side view of the tension of the back tension mechanism of FIG. 17 used in the door lift assembly showing the overhead door moving between the vertical closed position and the horizontal open position.

As best shown in FIGS. 18 and 19, tensioner 310 includes five main components: a piston housing 320, a linkage 330, a reciprocating piston shaft 340, a piston couple 350, a piston collar 360, and a coil spring 370. Piston housing 320 and linkage 330 are cut and bent formed from sheets of heavy gauge steal. Piston housing 320 is bent or formed to have two opposed flat flanges 322 and an integral raised U-shaped central body 324 that partially encloses spring loaded piston shaft 340 and collar 360. Linkage 330 is bent or formed to have two opposed sidewalls 332 and an integral back wall 334. Pistol shaft 340 is a length of steel rod. Piston couple 350 is a cast or machined steel component having an integral head 352, shoulder 354 and neck 356. Piston couple 350 is connected to the proximal end of piston shaft 340. Couple neck 356 seats within an end slot cut or machined into the proximal end of piston shaft 340 and is secured by a sturdy roll pin that extends through aligned lateral bores in the piston shaft 340 and each couple neck. Piston collar 360 is machined from a block of brass or similar material. Piston collar 360 is pivotally mounted within the distal end of piston housing 320 and has a central bore 361 for receiving the distal end of piston shaft 340 therethrough. Piston collar 360 is covered, treated or impregnated with lubricants to allow piston shaft 330 to smoothly reciprocate through the collar with reduced friction. Coil spring 370 is carried by piston shaft 340 and seated in compression between piston collar 360 and couple shoulder 354.

The tensioner components are interconnected for pivotal movement at four pivot points A-D. Each pivot point A-D is facilitated by a pivot connection, which includes a pivot pin 312, a pair of threaded bushings 314 and lock ring nuts 316, and a cotter key 318. Bushings 304 are turned into threaded bores in piston housing 320 and linkage 330. In alternative embodiments, the threaded bushings and lock rings can be replaced with press fit bushings. Tension cable 390 is connected to linkage 330 at pivot point A. At pivot point A, a first pivot pin 312 extends through an end eyelet 392 of cable 380 and aligned lateral bores in the sidewall 333 at the proximal end of linkage 330. Piston couple 350 is connected to linkage 330 at pivot point B. At pivot point B, a second pivot pin 312 extends through the lateral bore in couple head 352 and aligned lateral bores in the sidewall 333 at a mid point in linkage 330. Linkage 330 is connected to piston housing 320 at pivot point C. At pivot point C, a third pivot pin 312 extends through aligned lateral bores in the sidewall 333 at the distal end of linkage 330 and aligned lateral bores in the central body 322 of the piston housing 320. Piston collar 360 connects the distal end of piston shaft 340 to piston housing 320 at pivot point D for reciprocal movement through the collar within the housing. At pivot point D, a fourth pivot pin 302 extends through a lateral bore in piston collar 360, a longitudinal slot machined into the distal end of piston shaft 340 and aligned the lateral bores in central body 322 of piston housing 320. Pivot point A allows tension cable 390 to pivot freely with respect to linkage 330. Pivot point C allows linkage 330 to pivot relative to piston housing 320. Pivot points B and C allow piston shaft 340 to pivot and reciprocate within piston housing 320 with the rotation of linkage 330.

Figure 25:
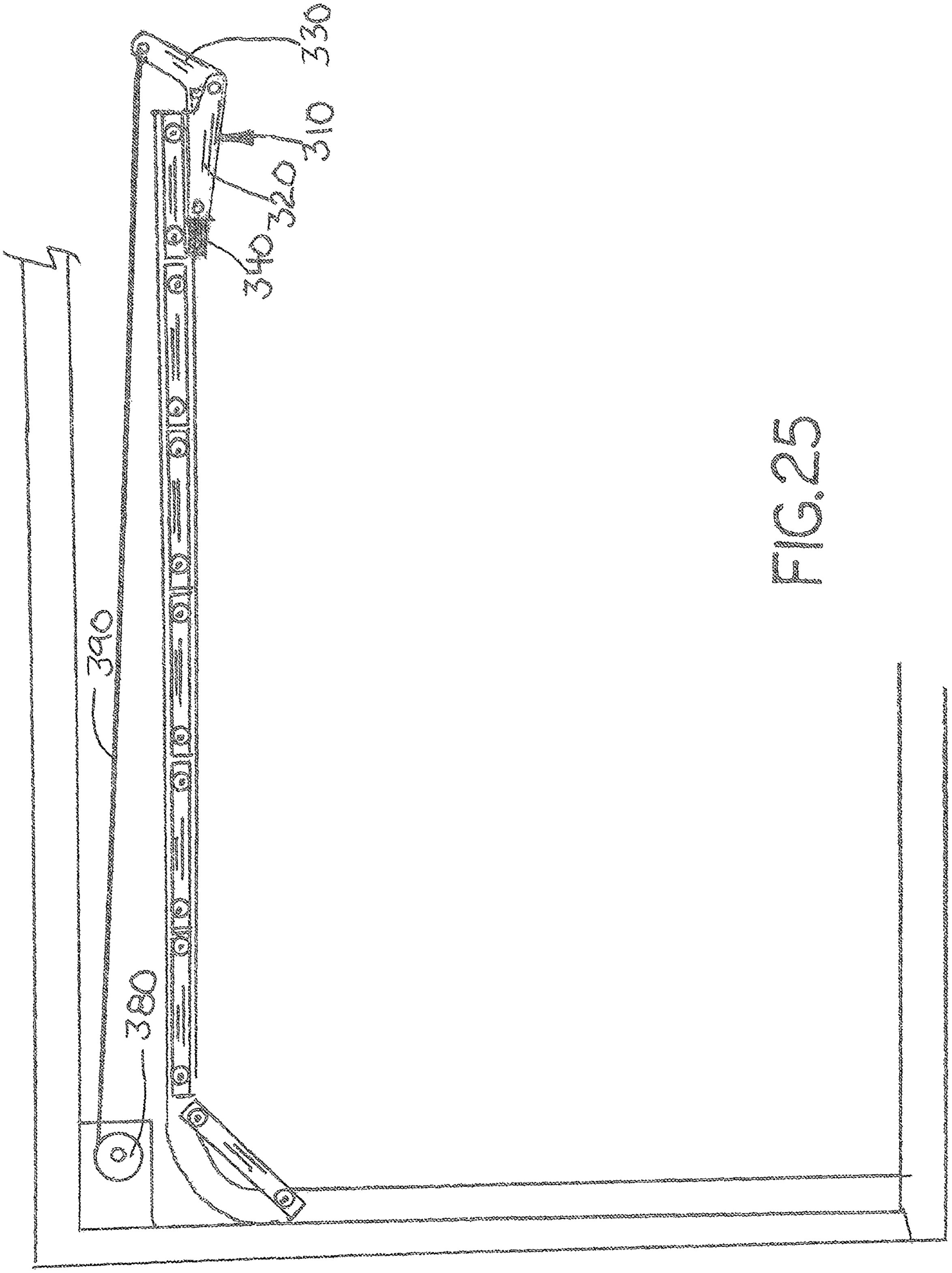
FIG. 25 is a simplified side view of the back tension mechanism of FIG. 17 used in the door lift assembly showing the overhead door in the horizontal closed position.
Figure 26:
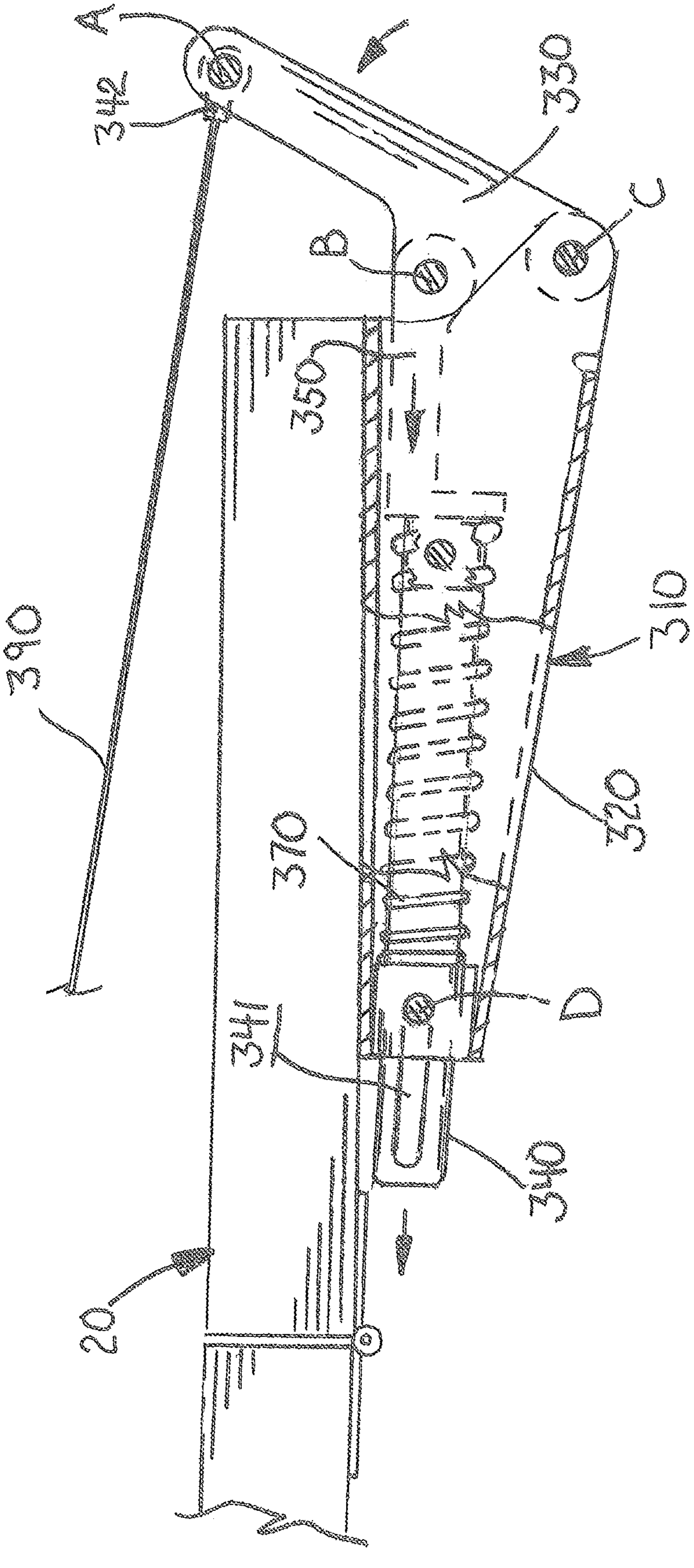
FIG. 26 is another side view of the tension of the back tension mechanism of FIG. 17 used in the door lift assembly showing the overhead door in the horizontal closed position.

FIGS. 21-26 illustrate the operation of tensioner 310 as door 20 moves from its vertical closed position to the horizontal open position. Linkage 330 pivots between an extended position when door 20 is in the close position (FIGS. 21 and 22) and a pivoted position when the door 20 is in the open position (FIGS. 25 and 26). In the extended position, linkage 330 extends upward to cable drum 380 with a minimal length of cable 390 exposed. In the pivoted position, linkage 330 pivots over the edge of door 20 so that cable 390 is closely spaced clear of door 20. Tensioner 310 provides back tension force on cable 390 as door 20 moves between the closed and open positions. Linkage 330 is biased toward its extended position by the compression of spring 370 about piston shaft 340 within tension housing 320, which creates constant tension on cable 390. As each panel of door 20 moves through the curved transition between vertical track 32 and horizontal track 34, linkage 330 "rocks" back and forth relative to piston housing 320 with piston shaft reciprocating through piston collar 360 under the compression force of spring 370. The "rocking" action of linkage 330 under the compression force of spring 370 allows tensioner 310 to accommodate the variances and oscillations in the back tension required to prevent "unspooling" while simultaneously not effecting the function or operation of torsion spring counterbalance 110 or electric operator 130.

Tension mechanism 300 readily accommodates the use of the lift assembly of this invention with a variety of over head doors having different sizes, weight and numbers of panel sections. The spring loaded piston action of tensioner 310 compensates for variance and oscillations in the required back tension forces as each successive door panel moves through the curved transition between the vertical and horizontal tracks. The spring loaded piston action of tensioner 310 also helps isolate the required back tension force exerted on cable 370 from the operation of torsion spring counterbalance 110 and electric operator 130 and reduces undo stress on cable 390, cable drum 380 and drive shaft 112.

In alternative embodiments of tensioner 310, the spring loaded piston mechanism can be replaced with pneumatic and hydraulic pistons, which can be used to provide the compression force to linkage 330. In addition, other tensioner embodiments may be configured to exert expansive forces rather than compressive forces on linkage members to accommodate the variances and oscillations in the back tension.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A door lift assembly provided in a structure having a structure interior thereof and a door opening into the structure interior, the door opening defined in part by a door frame header traversing over the door opening, the structure also including an overhead door riding along a pair of track assemblies having a horizontal track, a vertical track and an arcuate track section between the vertical track and the horizontal track for movement between a vertically oriented closed position enclosing the door opening and a horizontally oriented open position spaced from the door opening, the door lift assembly used to raise and lower the door between the closed position covering the door opening and the open position spaced over the door opening within the structure interior, the door lift assembly comprising:

an elongated rotatable shaft traversing above the door opening;

a lift drum affixed to the shaft;

a lift cable wound to the cable drum and connected to the overhead door;

a powered operator mounted to the door frame header above the door opening for raising and lowering the overhead door between the closed position and open position; and a back tension mechanism operatively mounted between the shaft and the door to prevent the lift cable from inadvertently unspooling from the cable drum as the overhead door moves from the open position to the closed position, the back tension mechanism includes a tensioner mounted to the door, a back tension cable drum fixed to the shaft, and a back tension cable wound to the back tension drum and connected to the tensioner, the tensioner includes a tensioner housing, a linkage pivotally connected to the back tension cable and to the tensioner housing for movement between an extended position and a folded position, and a piston reciprocally disposed within the tensioner housing and pivotally connected to the linkage for exerting a force on the linkage biasing the linkage toward the extended position as the linkage moves between the extended position and the folded position.

2. The door lift assembly of claim 1 wherein the piston includes an elongated piston shaft pivotally connected between the housing and the linkage and a spring mounted over the shaft under compression to exert the force on the linkage when the linkage is in both the extended position and the folded position.

3. The door lift assembly of claim 2 the tensioner also includes a piston couple affixed to a first end of the piston shaft and a piston collar pivotally mounted to and disposed within the tensioner housing, a second end of the piston shaft shiftably extends through the piston collar.

4. The door lift assembly of claim 3 wherein the piston couple includes a couple head part and a couple shoulder part, the linkage pivotally connected to the couple head part.

5. The door lift assembly of claim 4 wherein the spring is seated over the piston shaft under compression between the tensioner collar and the couple shoulder part.

6. The door lift assembly of claim 1 wherein the tension cable is connected to the linkage at a first pivot point, the linkage is connected to the tensioner housing at a second pivot point, the piston is connected to the linkage at a third pivot point located between the first pivot point and the second pivot point.

7. A back tension mechanism provided in a structure having a structure interior thereof and a door opening into the structure interior and defined in part by a door frame header traversing over the door opening and including an overhead door riding along a pair of track assemblies having a horizontal track, a vertical track and an arcuate track section between the vertical track and the horizontal track for movement between a vertically oriented closed position enclosing the door opening and a horizontally oriented open position spaced from the door opening, the structure also includes a door lift assembly used to raise and lower the door between the closed position covering the door opening and the open position spaced over the door opening within the structure interior, the door lift includes an elongated rotatable shaft traversing above the door opening, a lift drum affixed to the shaft, a lift cable wound to the cable drum and connected to the overhead door, and a powered operator mounted to the door frame header above the door opening for raising and lowering the overhead door between the closed position and open position, the back tension mechanism operatively mounted between the shaft and the door to prevent the lift cable from inadvertently unspooling from the cable drum as the overhead door moves from the open position to the closed position, the back tension mechanism comprises:

a tensioner mountable to the door;

a back tension cable drum affixable to the shaft; and a back tension cable wound to the back tension drum and connected to the tensioner;

the tensioner includes a tensioner housing, a linkage pivotally connected to the back tension cable and to the tensioner housing for movement between an extended position and a folded position, and a piston reciprocally disposed within the tensioner housing and pivotally connected to the linkage for exerting a force on the linkage biasing the linkage toward the extended position as the linkage moves between the extended position and the folded position.

8. The back tension mechanism of claim 7 wherein the piston includes an elongated piston shaft pivotally connected between the housing and the linkage and a spring mounted over the shaft under compression to exert the force on the linkage when the linkage is in both the extended position and the folded position.

9. The back tension mechanism of claim 8 the tensioner also includes a piston couple affixed to a first end of the piston shaft and a piston collar pivotally mounted to and disposed within the tensioner housing, a second end of the piston shaft shiftably extends through the piston collar.

10. The back tension mechanism of claim 9 wherein the piston couple includes a couple head part and a couple shoulder part, the linkage pivotally connected to the couple head part.

11. The back tension mechanism of claim 10 wherein the spring is seated over the piston shaft under compression between the tensioner collar and the couple shoulder part.

12. The back tension mechanism of claim 7 wherein the tension cable is connected to the linkage at a first pivot point, the linkage is connected to the tensioner housing at a second pivot point, the piston is connected to the linkage at a third pivot point located between the first pivot point and the second pivot point.

* * * * *